US005999570A

United States Patent [19]
Chaki

[11] Patent Number: 5,999,570
[45] Date of Patent: Dec. 7, 1999

[54] TRANSMISSION APPARATUS, SENDING APPARATUS, AND RECEIVING APPARATUS, AND TRANSMISSION METHOD

[75] Inventor: Yasuyuki Chaki, Chiba, Japan

[73] Assignee: Sony Corporation, Tokyo, Japan

[21] Appl. No.: 08/752,164

[22] Filed: Nov. 18, 1996

[30] Foreign Application Priority Data

Nov. 21, 1995 [JP] Japan .................................. P07-302414

[51] Int. Cl.⁶ ........................... H04B 10/00; H04L 21/18
[52] U.S. Cl. ...................... 375/281; 375/308; 375/326; 375/332; 359/181; 359/158
[58] Field of Search ................... 325/257, 259, 325/279, 281, 308, 329, 332; 359/181, 183, 158, 189; 375/326; 329/304; 332/103

[56] References Cited

U.S. PATENT DOCUMENTS

| | | | |
|---|---|---|---|
| 4,930,139 | 5/1990 | Chandler et al. | 375/307 |
| 5,355,133 | 10/1994 | Shimpuku et al. | 341/58 |
| 5,357,284 | 10/1994 | Todd | 348/486 |
| 5,400,023 | 3/1995 | Ino et al. | 341/59 |
| 5,432,799 | 7/1995 | Shimpuku et al. | 371/37.1 |
| 5,438,590 | 8/1995 | Tzukerman et al. | 375/259 |
| 5,537,422 | 7/1996 | Shimpuku et al. | 371/42 |
| 5,546,190 | 8/1996 | Hill et al. | 359/158 |
| 5,602,669 | 2/1997 | Chaki | 359/181 |
| 5,646,966 | 7/1997 | Chaki et al. | 375/368 |
| 5,745,582 | 4/1998 | Shimpuku et al. | 381/77 |

*Primary Examiner*—Young T. Tse
*Attorney, Agent, or Firm*—Limbach & Limbach LLP; Seong-Kun Oh

[57] ABSTRACT

The transmitter QPSK-modulates the audio data, generates a transmission channel clock having a frequency 5/4 times the data clock based on the audio data, and outputs the modulated signal resulted from QPSK-modulation at the timing of the transmission channel clock. The infrared emitter emits infrared-rays based on the modulated signal. Digital data is thus efficiently transmitted by way of infrared-rays with suppressed complexity of data processing for modulation and demodulation.

70 Claims, 22 Drawing Sheets

F I G. 6A
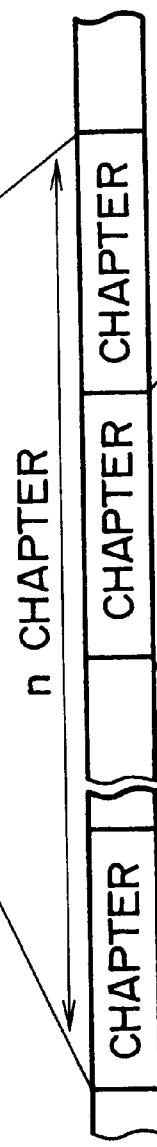
F I G. 6B
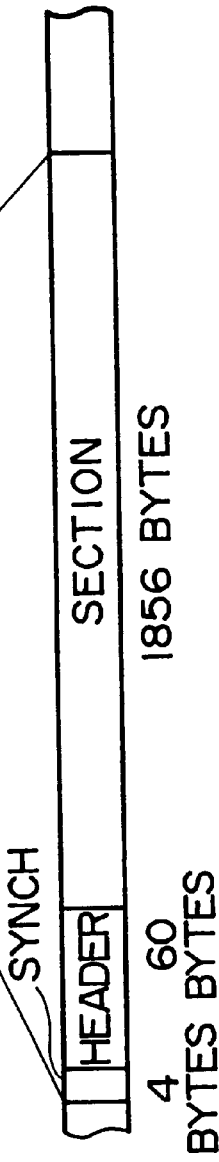
F I G. 6C

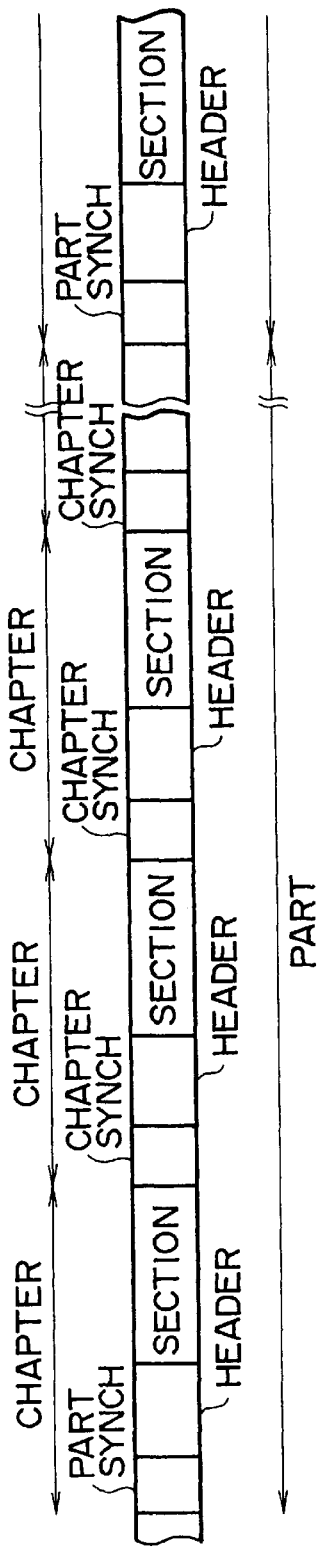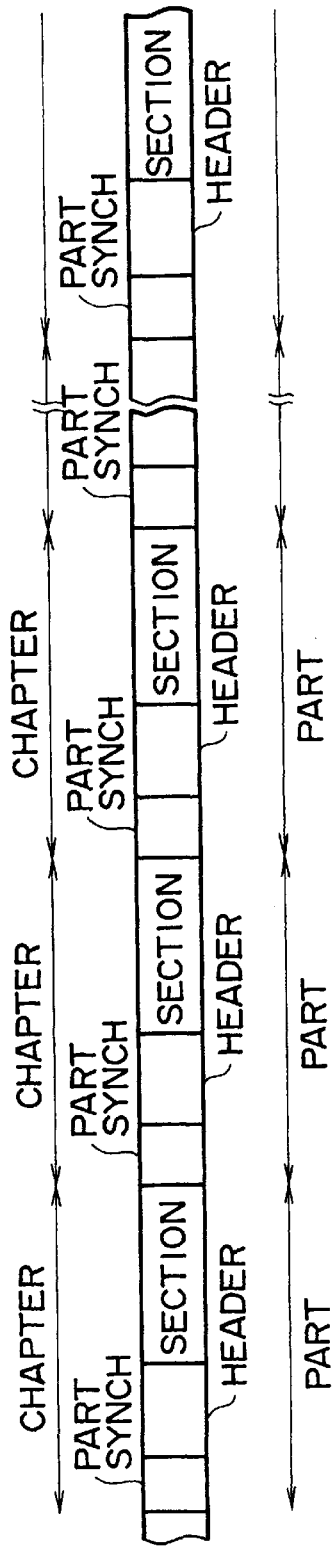

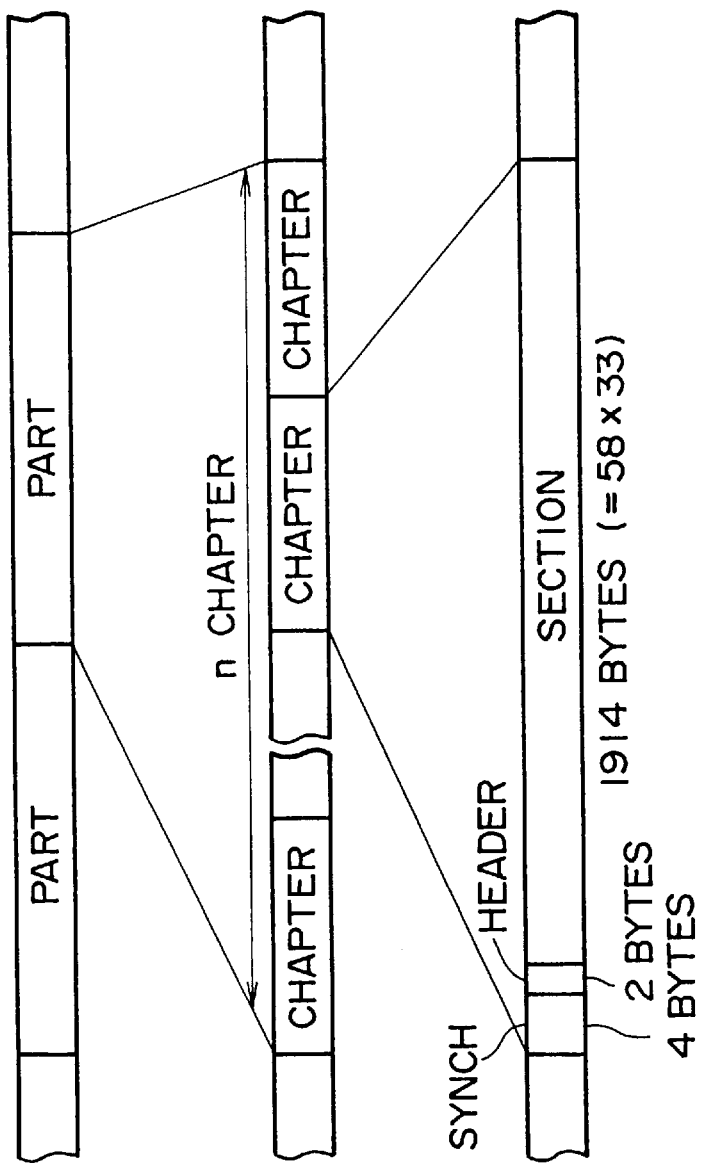

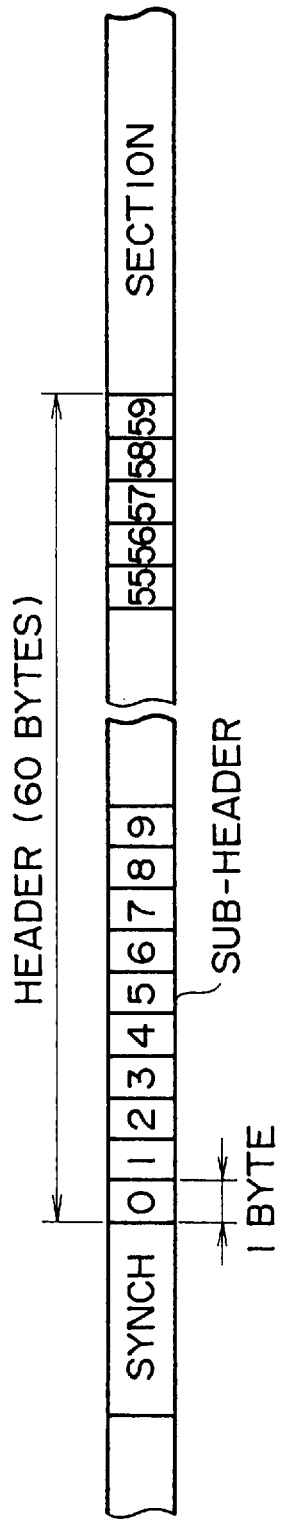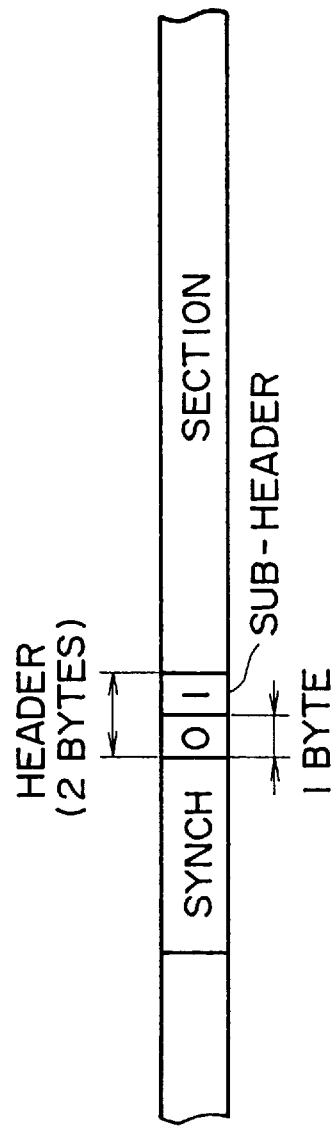
F I G. 21A
F I G. 21B

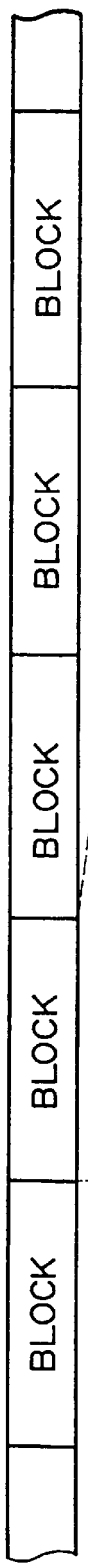
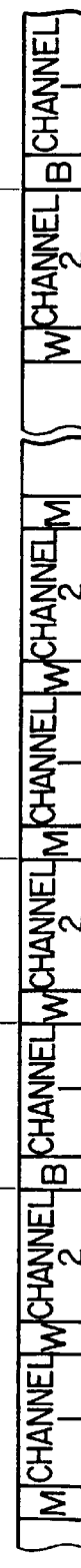
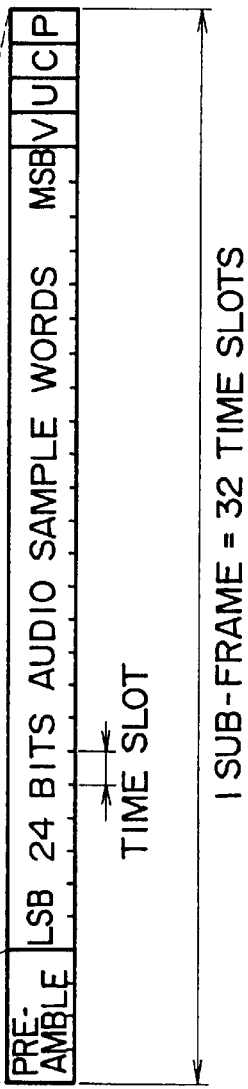
FIG. 23A
FIG. 23B
FIG. 23C
FIG. 23D

TRANSMISSION APPARATUS, SENDING APPARATUS, AND RECEIVING APPARATUS, AND TRANSMISSION METHOD

BACKGROUND OF THE INVENTION

1. Field of the Invention

The present invention relates to a transmission apparatus, sending apparatus, and receiver, and transmission method. In particular, this invention relates to a transmission apparatus, sending apparatus, and receiver, and transmission method preferably used for, for example, transmitting a digital audio signal regenerated by, for example, a digital audio apparatus to a speaker or headphone by way of infrared-rays.

2. Description of Related Art

In a conventional audio signal transmission device for transmitting an audio signal (aural signal) regenerated by an audio apparatus such as a CD (compact disc) player to other audio apparatus, for example, as speaker or headphone by way of infrared-rays, the CD player modulates the frequency of the audio signal to be transmitted, and an emitter is driven based on the resulting modulated signal. The infrared-ray corresponding to the modulated signal is emitted, the infrared-ray is transmitted in the space and received by an infrared receiver at the receiving side, for example, a speaker or a headphone. In the receiving side, the received infrared-ray is converted to a received signal corresponding to the above-mentioned modulated signal, and the original audio signal is regenerated by decoding the received signal.

Accordingly, an audio signal can be transmitted to a plurality of audio apparatuses simultaneously without physical transmission line by using the above-mentioned audio signal transmission device. However, in such audio signal transmission device, an audio signal is subjected to analog-modulation such as frequency-modulation, and such analog-modulation degrades signal-to-noise ration (S/N) of the audio signal in the receiving side if the transmission distance between the transmission side and the receiving side is far.

To avoid the degradation, recently the digital system in which an audio signal is digitally converted for transmission has been proposed. It is ideal that the ratio of data rate to transmission rate of a digital audio signal is one from the view point of transmission efficiency for using such digital system. However, because of the need for the transmission of error correcting code and other necessary data, the actual transmission rate is inevitably higher than the data rate for transmission of digital audio signals.

Accordingly, for improvement of transmission efficiency, the ratio of transmission rate to data rate of close to one is preferable, but if the ratio is complex, data processing may be complex for modulation and demodulation.

The transmission rate should be decided by taking both the improvement of transmission efficiency and the complex data processing into consideration.

Further, for example, since the frequency band permitted to use for transmission of audio signals by way of infrared-rays is specified by CP-1205 of EIAJ (Electronic Industries Association of Japan) and IEC (International Electrotechnical Commission)-1603, the transmission rate should thus be decided such that the transmission band used for the transmission is contained in these specified frequency bands.

The present invention is accomplished in view of these problems to perform not only efficient transmission by way of digital infrared-rays in conformity with specifications but also to suppress and minimize the complexity of data processing for modulation and demodulation.

SUMMARY OF THE INVENTION

The transmission apparatus described in the claim 1 is featured by the modulation means having a transmission channel clock generating means for generating a transmission channel clock having a frequency 5/4 times the data clock based on the digital data, and outputting the modulation signal at the timing of the transmission channel clock, and featured by the demodulation means having a data clock generating means for generating the data clock based on the received signal, and outputting the digital data at the timing of the data clock.

The transmission apparatus described in the claim 25 is featured by having a transmission channel clock generating means for generating a transmission channel clock having a frequency 5/4 times the data clock based on the digital data, and outputting the modulated signal at the timing of the transmission channel clock.

The receiving apparatus described in the claim 26 is featured by having a data clock generating means for generating a data clock having a frequency 4/5 times the clock based on the received signal, and outputting the digital data at the timing of the data clock.

The transmission method described in the claim 27 is featured by the transmission speed between the modulation means and the demodulation means being equivalent to the frequency 5/4 times the data clock of the digital data.

In the transmission apparatus described in claim 1, the transmission channel clock generating means generates the transmission channel clock having a frequency 5/4 times the data clock based on the digital data, and the modulation means output the modulated signal at the timing of the transmission channel clock. The data clock generating means generates the data clock based on the received signal and demodulation means outputs the digital data at the timing of the data clock.

In the transmission apparatus described in claim 25, the transmission channel clock generating means generates the transmission channel clock having a frequency 5/4 times the data clock based on the digital clock, and the modulated signal is outputted at the timing of the transmission channel clock.

In the receiving apparatus described in claim 26, the data clock generating means generates the data clock having a frequency of 4/5 times the clock based on the received signal, and the digital data is outputted at the timing of the data clock.

In the transmission method described in claim 27, the transmission speed between the modulation means and demodulation means is equivalent to a frequency 5/4 times the data clock of the digital clock.

BRIEF DESCRIPTION OF THE DRAWINGS

FIGS. 6A–C are a diagram for illustrating a format of a transmission data outputted from the transmission format generating circuit 15 shown in FIG. 3.

FIGS. 7A–B are a set of diagrams for describing part synch and chapter synch.

FIGS. 20A–C are a set of diagrams for illustrating the data transmission format outputted from a transmission format generating circuit 15 shown in FIG. 17.

FIGS. 21A–B are a set of diagrams for illustrating the format of a header.

FIGS. 23A–D are a set of diagrams for illustrating a bit stream (audio data) of IEC-958 format.

DETAILED DESCRIPTION OF THE PREFERRED EMBODIMENTS

The embodiments of the present invention will be described hereinafter, before the description, a corresponding embodiment (through one example) is added in a parenthesis subsequent to each means to clarify the correspondence between respective means of the present invention described in the claims and the embodiments described hereinafter, and to clarify features of the present invention as described herein under.

Figure 3:
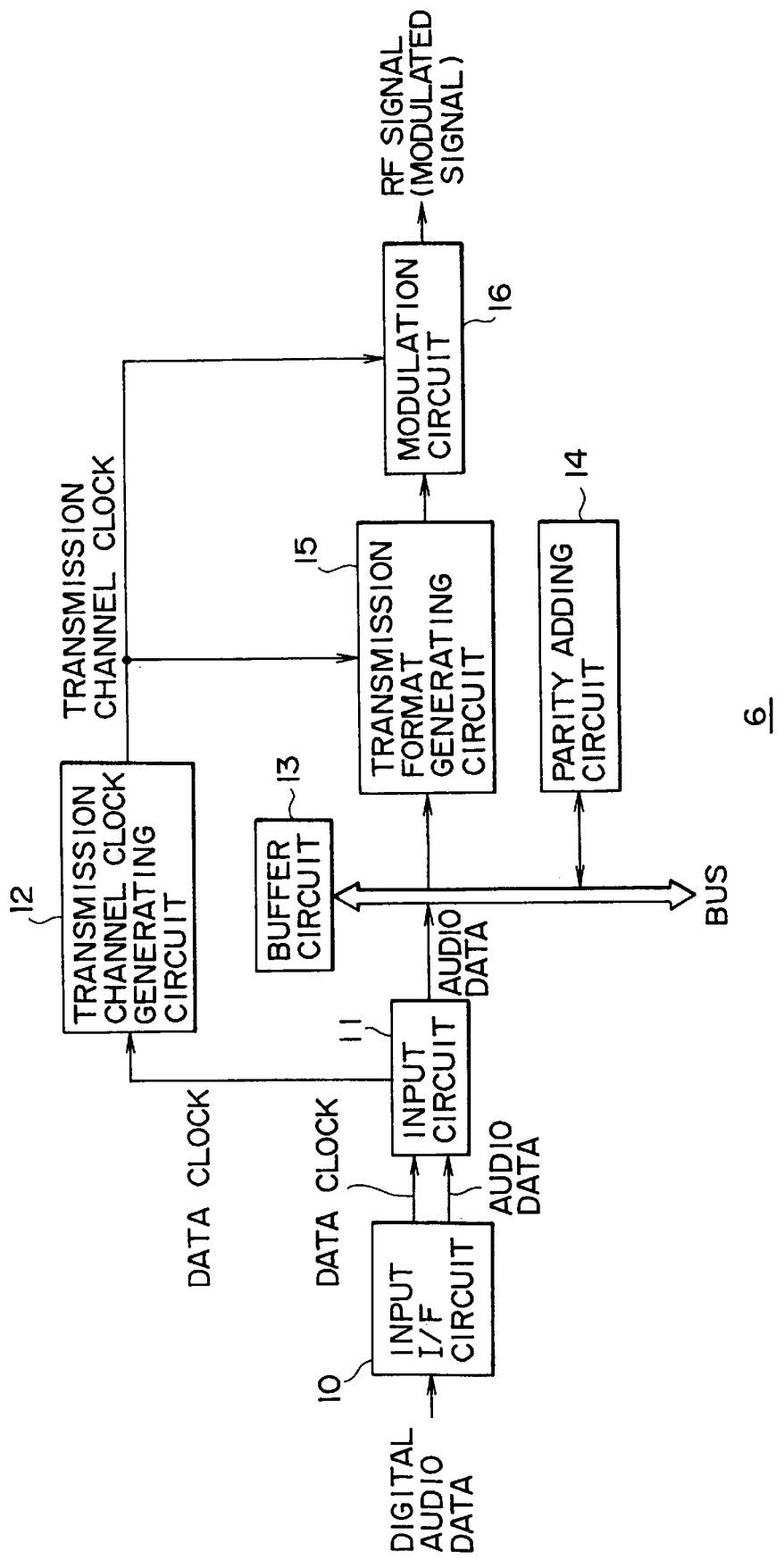
FIG. 3 is a block diagram for illustrating a detailed structural example of the transmitter 6 shown in FIG. 1.
Figure 13:
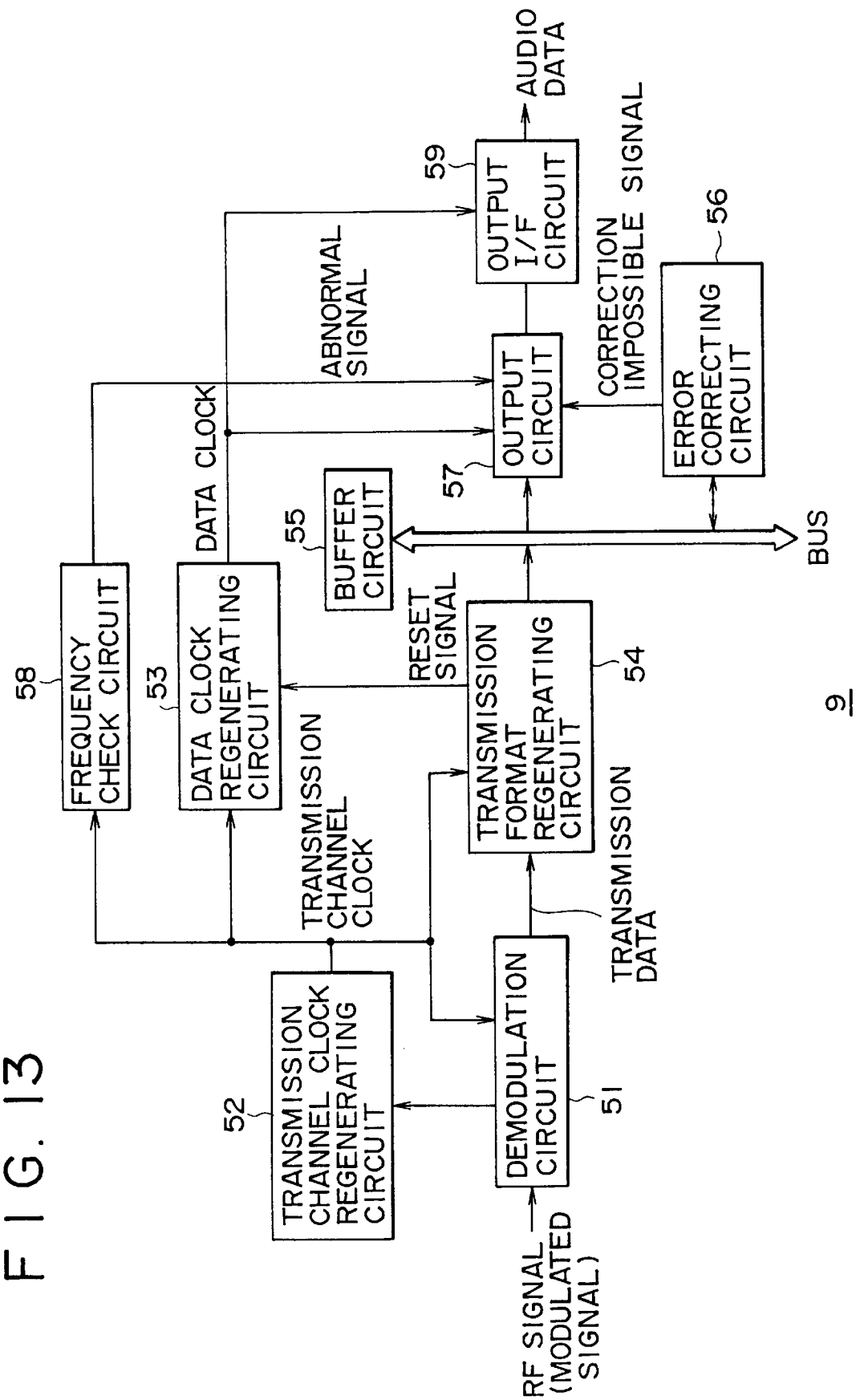
FIG. 13 is a block diagram for illustrating a detailed structural example of a receiver 9 shown in FIG. 1.

The transmission apparatus described in claim 1 is provided with a modulation means (for example, the transmitter 6 shown in FIG. 1) for phase shift modulating a sub-carrier based on a digital data (for example, digital audio signal) and outputting a modulated signal, an infrared emitting means (for example, the infrared emitter 7 shown in FIG. 1) for modulating infrared-rays, being the main carrier wave, based on the modulated signal outputted from the modulation means and outputting the modulated infrared-rays resultant from the modulation, a light receiving means (for example, the infrared detector 8 shown in FIG. 1) for receiving the modulated infrared-rays from the infrared emitting means and outputting the received signal corresponding to the modulated signal, and a demodulation means (for example, the receiver 9 shown in FIG. 1) for demodulating the received signal outputted from the light receiving means and regenerating the digital data, wherein the modulation means has a transmission channel clock generating means (for example, the transmission channel clock generating circuit 12 shown in FIG. 3) for generating a transmission channel clock having a frequency 5/4 times the data clock based on the digital data, and outputs the modulated signal at the timing of the transmission channel clock, and the demodulation means has a data clock generating means (for example, the data clock regenerating circuit 53 shown in FIG. 13) for generating the data clock based on the received signal, and outputs the digital data at the timing of the data clock.

Figure 10:
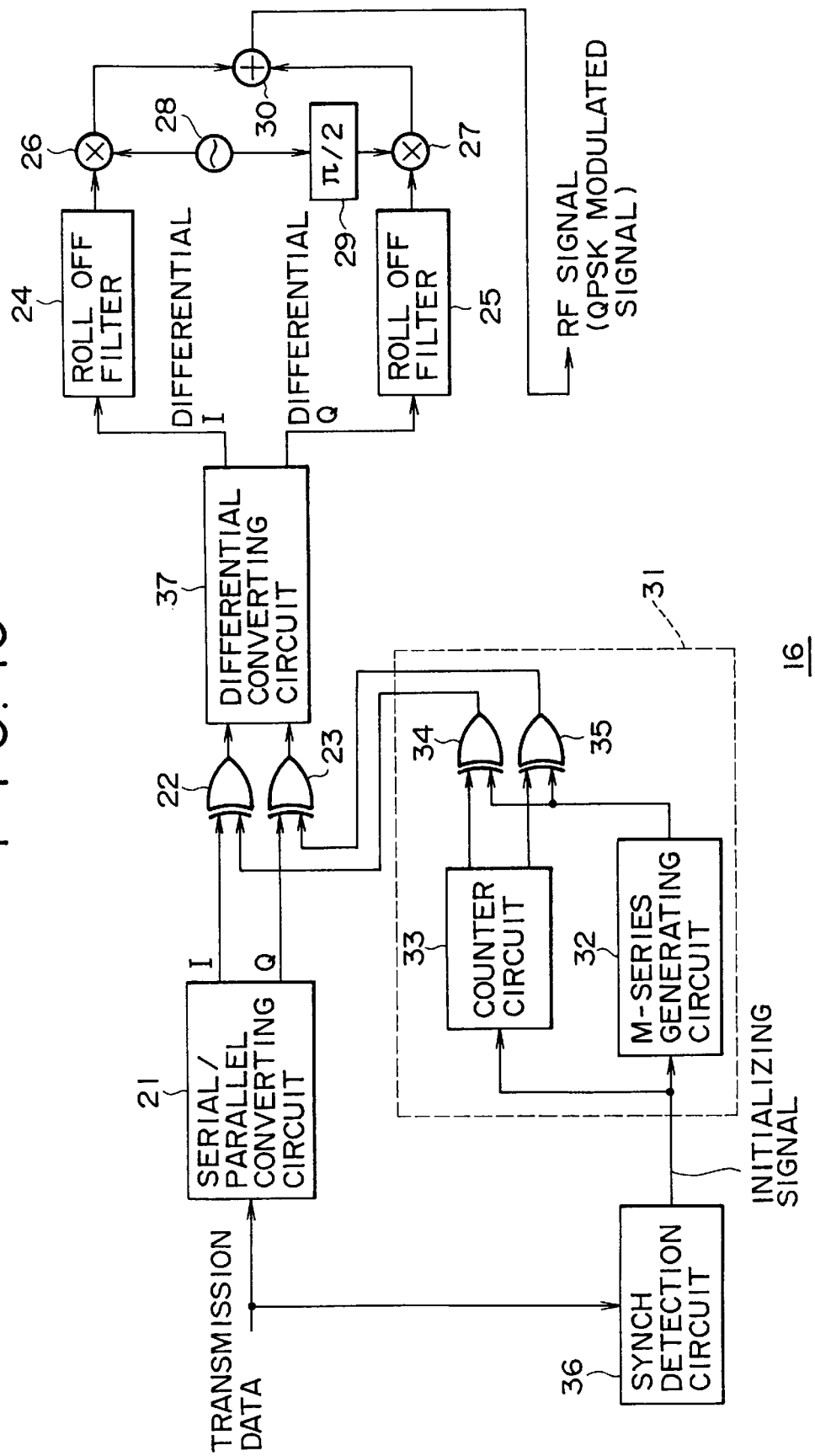
FIG. 10 is a block diagram for illustrating a detailed structural example of a modulation circuit 16 shown in FIG. 3.

The transmission apparatus described in claim 5 is provided with the modulation means additionally having differential coding means (for example, the differential conversion circuit 37 shown in FIG. 10) for differentially coding the symbol of the digital data in two bit units.

The transmission apparatus described in claim 7 is provided with the modulation means additionally having a random code generating means (for example, the random series generating circuit 31 shown in FIG. 10) for generating a random code, and a scrambling means (for example, the EXOR gates 22 and 23) for scrambling the symbol using the random code outputted from the random code generating means, wherein the differential coding means differentially codes the symbol scrambled by the scrambling means.

The transmission apparatus described in claim 8 is provided with the modulation means additionally having a random code generating means (for example, the random series generating circuit 31 shown in FIG. 10) for generating a random code, and a scrambling means (for example, the EXOR gates 22 and 23 shown in FIG. 10) for scrambling the digital data using the random code outputted from the random code generating means.

The transmission apparatus described in claim 11 is provided with the modulation means additionally having an error correcting code generating means (for example, the parity adding circuit 14 shown in FIG. 3) for generating an error correcting code for error correcting the digital data and adding it to the digital data.

The transmission apparatus described in claim 14 provided with the modulation means additionally having a structuring means (for example, the parity adding circuit 14 shown in FIG. 3) for structuring the digital data of 1536×n bytes (n is a positive integer) and the error correcting code of 320×n bytes as one unit.

The transmission apparatus described in claim 15 is provided with the modulation means (for example, the parity adding circuit 14 shown in FIG. 3) additionally having a structuring means for structuring the digital data of 1584×n bytes (n is a positive integer) and the error correcting code of 330×n bytes as one unit.

The transmission apparatus described in claim 16 is provided with the modulation means additionally having a memory means (for example, the buffer circuit 13 shown in FIG. 3) for storing the digital data added with the error correcting code, wherein the digital data added with the error correcting code is interleaved by being written in a certain writing order in the memory means and being subsequently read in a different reading order.

The transmission apparatus described in claim 17 is provided with the modulation means additionally having a memory means (for example, the buffer circuit 13 shown in FIG. 3) for storing the digital data added with the error correcting code, wherein the digital data added with the error correcting code is written in a certain writing order in the memory means and being subsequently read in a different reading order.

The transmission apparatus described in claim 18 is provided with the modulation means additionally having a synchronizing data adding means (for example, the transmission format generating circuit 15 shown in FIG. 3) for adding a synchronizing data for synchronizing in the demodulation means to the digital data.

The transmission apparatus described in claim 20 is provided with the modulation means additionally having a header adding means (for example, the transmission format generating circuit 15 shown in FIG. 3) for adding a prescribed header to the digital data.

The transmission apparatus described in claim 25 is provided with a modulation means (for example, the transmitter 6 shown in FIG. 1) for phase shift modulating a sub-carrier based on a digital data and outputting modulated signal, and an infrared emitting means (for example, the infrared emitter 7 shown in FIG. 1) for modulating infrared-rays, being the main carrier wave, based on the modulated signal outputted from the modulation means and for outputting the resulting modulated infrared-rays, wherein the modulation means has a transmission channel clock generating means (for example, the transmission channel clock generating circuit 12 shown in FIG. 3) for generating a transmission channel clock having a frequency 5/4 times the data clock based on the digital data, and outputs the modulated signal at the timing of the transmission channel clock.

The receiving apparatus described in claim 26 is a receiving apparatus for receiving the digital data provided with a receiving means (for example, the infrared detector 8 shown in FIG. 1) for receiving infrared-rays and outputting a received signal corresponding to the infrared-ray, and a demodulation means (for example, the receiver 9 shown in FIG. 1) for demodulating the received signal outputted from the receiving means and regenerating a digital data, wherein the demodulation means has a data clock generating means (for example, the data clock regenerating circuit 53 shown in FIG. 13) for generating a data clock having a frequency 4/5 times the clock based on the received signal, and outputs the digital data at the timing of the data clock.

A transmission method described in claim 27 is a transmission method using a transmission apparatus provided with a modulating means (for example, the transmitter 6 shown in FIG. 1) for phase shift modulating a sub-carrier based on a digital data and outputting the modulated signal, an infrared emitting means (for example, the infrared emitter 7 shown in FIG. 1) for modulating infrared-rays, being the main carrier wave, based on the modulated signal outputted from the modulation means and outputting the resultant modulated infrared-rays, a receiving means (for example, the infrared detector 8 shown in FIG. 1) for receiving the modulated infrared-rays from the infrared emitting means and outputting a receiving signal corresponding to the modulated signal, and a demodulation means (for example, the receiver 9 shown in FIG. 1) for demodulating the received signal outputted from the receiving means and regenerating the digital data, wherein the transmission speed between the modulation means and the demodulation means is a speed equivalent to the frequency 5/4 times the data clock of the digital data. Of course, this description will not mean that the respective means are limited to the means described herein above.

Figure 1:
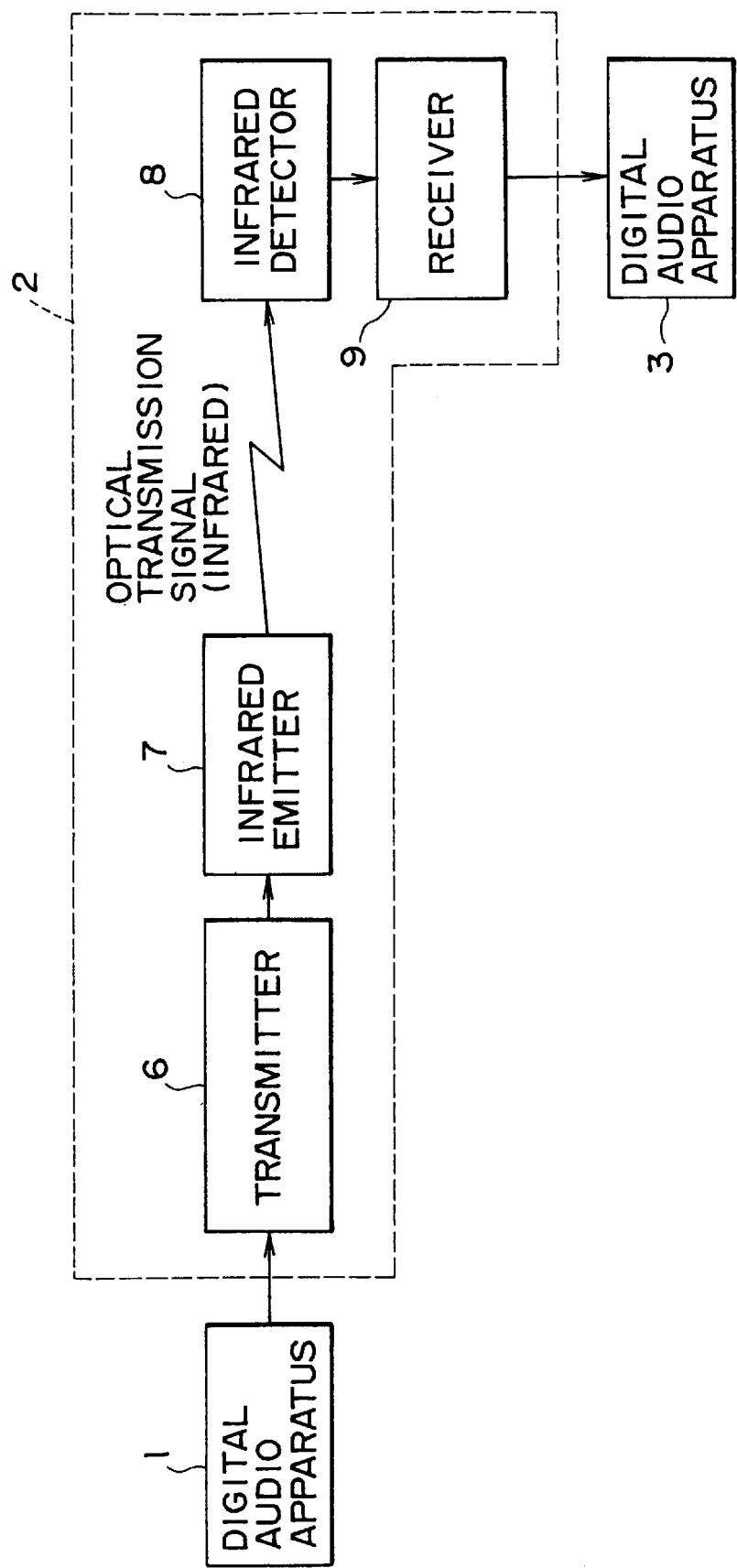
FIG. 1 is a block diagram for illustrating the structure of the first embodiment of an audio system in accordance with the present invention.

FIG. 1 shows the structure of an embodiment of an audio system to which the present invention is applied. In this audio system, a digital audio signal outputted from a digital audio apparatus 1 is transmitted to a digital audio apparatus 3 through an audio signal transmission apparatus 2.

In detail, the digital audio apparatus 1 is, for example, a CD (compact disc) player, DAT (digital audio tape) player, or MD (minidisc) (MD, minidisc is a brand name) player, and regenerates digital audio signals to output it to the audio signal transmission apparatus 2 through, for example, a coaxial cable or optical fiber. Digital audio signals outputted from the digital audio apparatus 1 have a data format in conformity with, for example, IEC-958 standard.

The audio signal transmission apparatus 2 comprises a transmitter 6, an infrared emitter 7, an infrared detector 8, and a receiver 9, and is structured so that a digital audio signal from the digital audio apparatus 1 is transmitted to the digital audio apparatus 3 by way of infrared-rays.

In detail, the transmitter 6 QPSK modulates or phase shift-modulates (digital phase modulation), in combination of, for example, TCM (Trelliscoded Modulation) modulation and 8PSK (Eight Phase shift Keying) modulation, the desired sub-carrier and, outputs the modulated signal which is RF (Radio Frequency) signal obtained thereby to an infrared emitter. Though the transmitter 6 solely perform 8PSK modulation instead of a combined modulation with TCM modulation and 8PSK modulation, the error rate increases of only the 8PSK modulation in comparison with the QPSK modulation because distance between information points to be judged is too short.

Therefore, it is preferable to combine TCM modulation instead of solely using the 8PSK modulation to prevent the increase of error rate by the most likelihood decoding in the receiving side. It is made possible by applying the combined modulation (referred to as TCM8PSK modulation hereinafter) of TCM modulation and 8PSK modulation that the infrared power outputted from the infrared emitter 7 subsequent to the transmitter 6 is reduced assuming that the error rate is allowed to be at the same level as it is when only 8PSK modulation is used (on the contrary, if the infrared power is not changed, it is possible to transmit farther).

The infrared emitter 7 is an emitter comprising, for example, an amplifying circuit, light emitting diode (or laser diode), lens, and optical filter, and emits infrared-rays based on a modulated signal from the transmitter 6, and outputs thereby modulated infrared-ray which is generated by modulating the main carrier, namely an infrared-ray.

The modulated infrared-ray is transmitted in the space and received by the infrared detector 8. The infrared detector is an infrared receiver comprising, for example, an optical filter, a lens, and a photodiode (or phototransistor), and is structured so as to output a signal (received signal) corresponding to the received infrared-ray. When, a signal corresponding to the modulated infrared-ray, namely the RF signal equivalent to the modulated signal outputted from the transmitter 6, is therefore outputted from the infrared detector 8. The RF signal is provided to the receiver 9, and the RF signal is demodulated therein to be generated as a digital audio signal.

Figure 2:
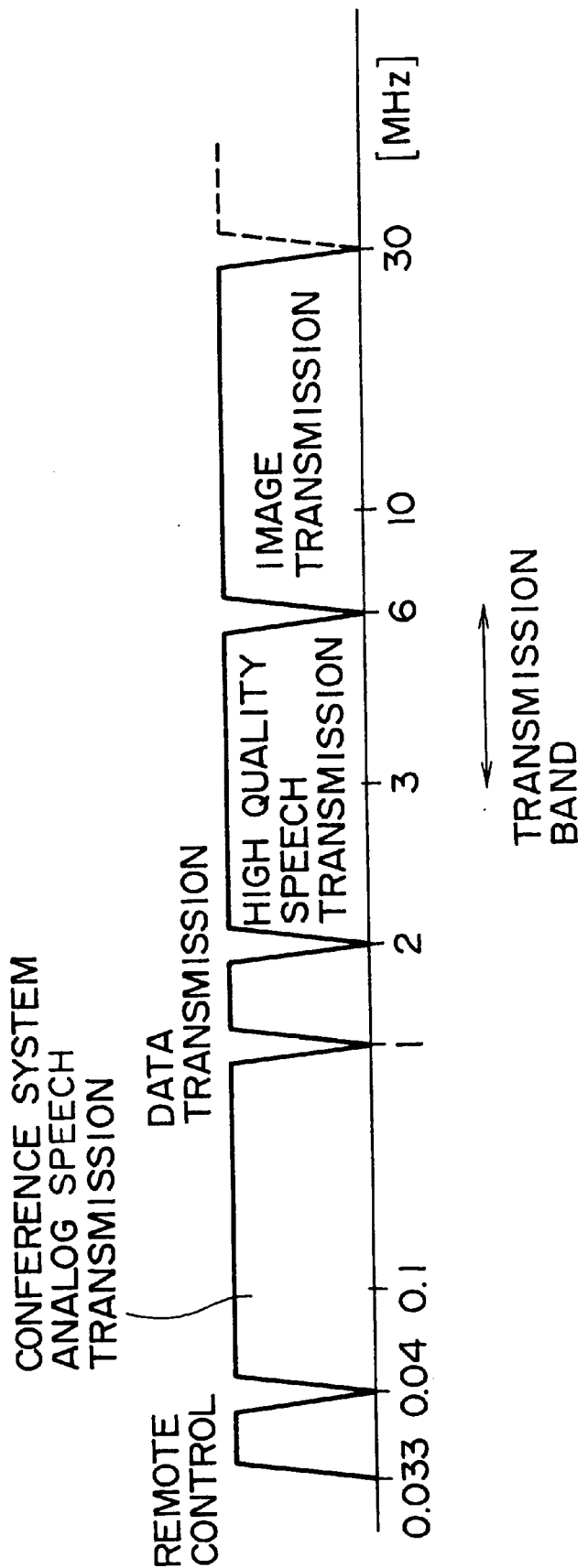
FIG. 2 is a diagram for illustrating a frequency band assigned to the infrared data transmission by CP-1205 of EIAJ and IEC1603.

The digital audio signal is outputted to the digital audio apparatus 3 through, for example, a coaxial cable or an optical fiber. The digital audio apparatus 3 is, for example, a D/A converter and a speaker, or a DAT apparatus where the digital audio signal is D/A converted, and outputted from a speaker. Otherwise, the digital audio signal is recorded in a recording medium such as a DAT. As shown in FIG. 2, according to CP-1205 of EIAJ and IEC-160, the frequency band from 2 MHz to 6 MHz is assigned for transmission of infrared aural signal (audio signal). Out of this frequency band, a range from 2 MHz to 6 MHz is used mainly for transmission of analog audio signal. The audio signal transmission apparatus 2 in accordance with the embodiment uses a frequency band, for example, from 3 MHz to 6 MHz for transmission (sending) of its audio signal (digital audio signal) as the transmission band.

Next, FIG. 3 shows the structural example of the transmitter 6 shown in FIG. 1. A digital signal in conformity with, for example, IEC-858 format inputted from the digital audio apparatus 1 is inputted to an input I/F circuit 10. The input I/F circuit 10 extracts the data clock from the digital audio signal (referred simply to as audio data for convenience hereinafter) and outputs it to an input circuit 11. The input circuit 11 supplies the data clock to a transmission channel clock generating circuit 12. The transmission channel clock generating circuit 12 comprises, for example, a PLL (Phase Lock Loop) circuit, a frequency dividing circuit, and a multiplication circuit, and generates a transmission channel clock with a frequency of 5/4 times the data clock from the input circuit 11. The transmission channel clock is supplied to a transmission format generating circuit 15 and a modulation circuit 16, and the transmission format generating circuit 15 and the modulation circuit 16 are operated in response to the transmission channel clock.

As a result, a modulated signal is outputted from a modulation circuit 16 described hereinafter at the timing of the transmission channel clock. In other words, the modulated signal is transmitted at a transmission speed equivalent to 5/4 times the data clock of the audio data, and the ratio of transmission rate of data transmitted to the receiver 9, which is transmitted from the transmitter 6 through the infrared emitter 7 and infrared detector 8, to the data rate of the audio data is therefore 5/4.

In the modulation circuit 16, for example, assuming that QPSK modulation is performed, that is, assuming that a symbol which is formed by dividing the audio data in two bit units is subjected to digital phase modulation, if the frequency of the transmission channel clock is 5/4 times the data clock, the transmission channel clock frequency is also 5/8 times (=5/4×1/2) the symbol clock (symbol rate).

Figure 4:
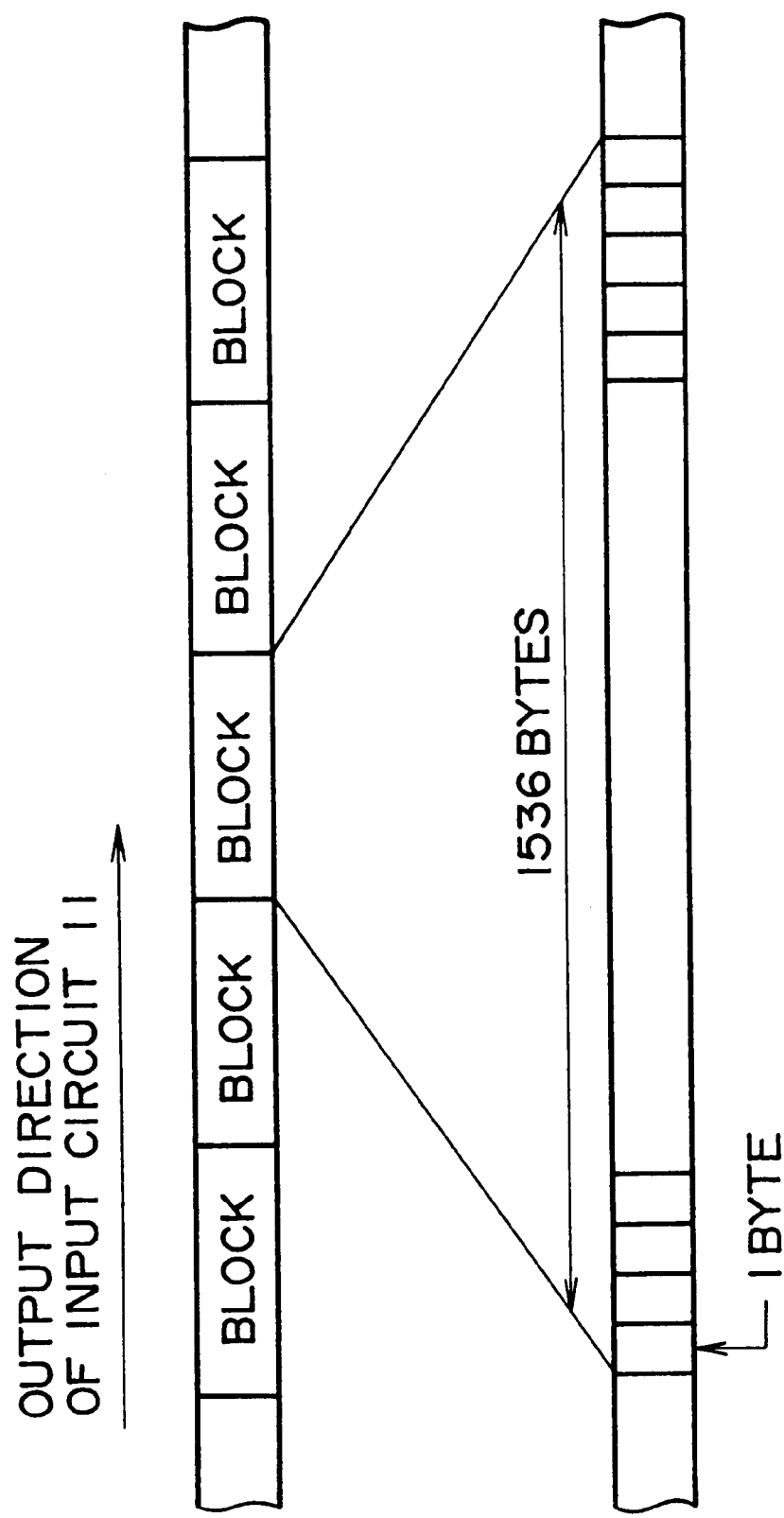
FIG. 4 is a diagram for illustrating a format of audio data outputted from the input circuit 11 shown in FIG. 3.

The reason for prescribing the transmission rate to be at a frequency 5/4 times the data clock namely the data rate as described herein above, is described herein under. As described hereinbefore, the ratio of transmission rate to data rate is required to be close to one to improve the transmission efficiency, and also, the ratio is required to be a more simple integer ratio to prevent the complex data processing. As a result of examination on such integer ratio by the inventors, it was concluded that 5/4 is optimal. The input interface (I/F) circuit 10 extracts the data clock from the inputted audio data as described herein above, and also converts the audio data to a desired format to output to the input circuit 11. Upon receiving the audio data converted to the desired format from the input I/F circuit 10, the input circuit 11 outputs it to a buffer circuit 13 through a bus. FIG. 4 shows a format example of the audio data inputted to the input circuit 11. An input data (bit stream) to be inputted to the input circuit 11 is composed of block units, and each block is composed of audio data of, for example, 1536 bytes.

Figure 5:
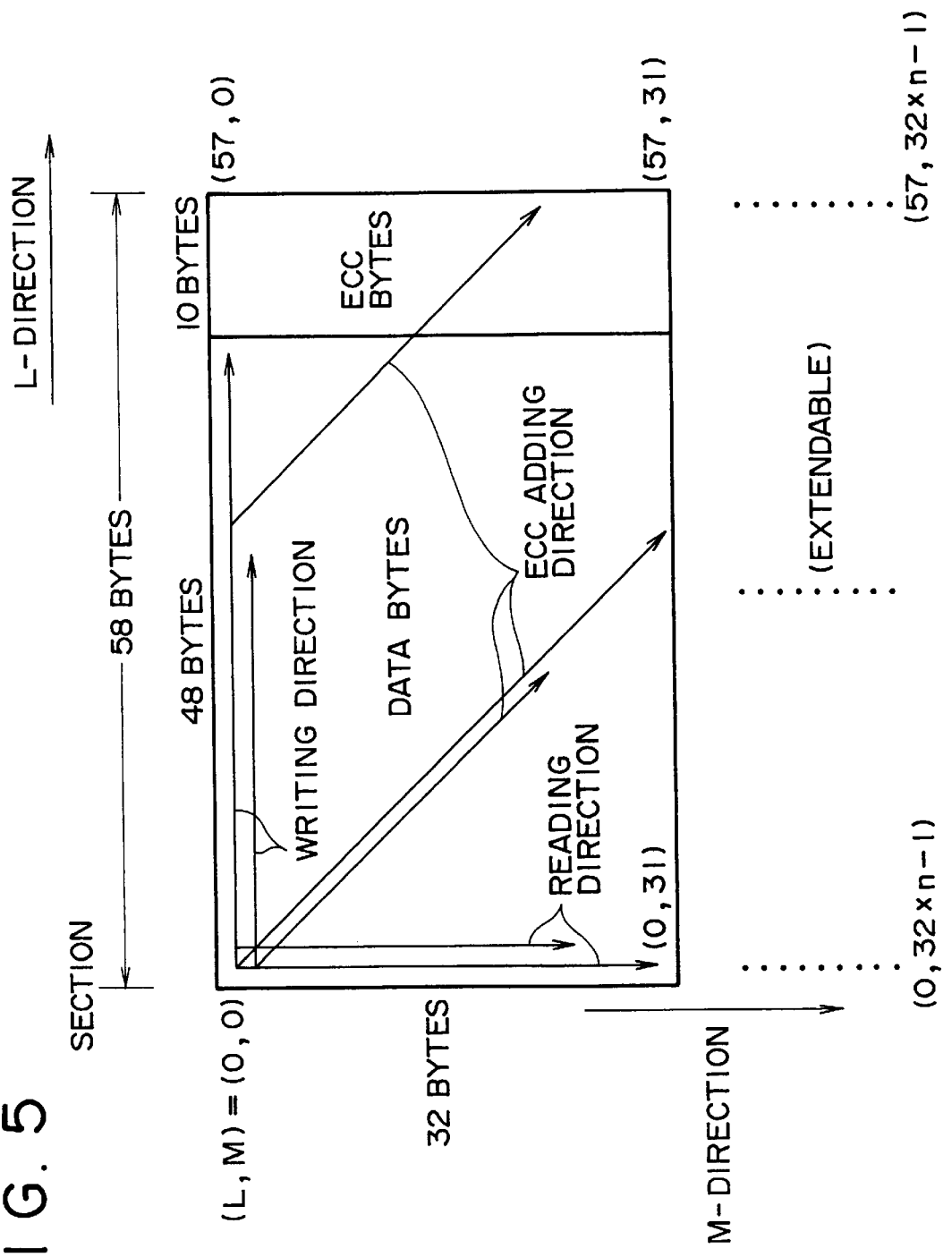
FIG. 5 is a diagram for describing a method for data writing and reading in the buffer circuit 13 shown in FIG. 3.

The buffer circuit 13 stores the audio data from the input circuit 11 in byte units. In detail, the buffer circuit 13 stores initially the audio data, for example, in L-direction (from left to right) as shown in FIG. 5, and when the audio data of 48 bytes is stored, continues to store the subsequent audio data in the L-direction in byte units on the row one step below the top. When the audio data of 48 bytes are stored, the buffer circuit 13 continues to store the subsequent audio data up to 48 bytes in byte units on the row further one step below the second, and continuously the same processing is repeatedly continued in M-direction until the audio data of 32×n bytes is stored.

In other words, assuming that the address (memory address) of the buffer circuit 13 is represented by a coordinate (L, M) of L- and M-directions, respectively, the most upper and left address is represented by (0, 0), and L- or M-coordinate axis increases in left direction or downwards, respectively, and the audio data from the input circuit 11 is written in the buffer circuit 13 in the following order (writing order)

(0, 0), (1, 0), (2, 0), . . . , (46, 0), (47, 0),
(0, 1), (1, 1), (2, 1), . . . , (46, 0), (47, 0),
(0, 2), (1, 2), (2, 2), . . . , (46, 0), (47, 0),
..
..
(0, 31), (1, 31), (2, 31), . . . , (46, 31), (47, 31),
..
..
..
(0, 32n-1), (1, 32n-1), (2, 32n-1), . . . , (46, 32n-1), (47, 32n-1)

As described herein above, the audio data is stored in the buffer circuit 13 in units of 48×(32×n) bytes, where n is an integer of one or larger, and the interleave length of the interleave performed by the transmission format generating circuit 15 can be adjusted by selecting a desired value for n. When the digital audio signal is transmitted as it is in this embodiment, n is selected to be, for example, one.

When the audio data of 48×(32×n) bytes is stored in the buffer circuit 13, a parity adding circuit 14 reads the audio data from the buffer circuit 13 through the bus, and generates an error correcting code (parity) (ECC) for correcting the error of the audio data. Further, the parity adding circuit 14 adds the error correcting code to the audio data, and sends the corrected audio data to the buffer circuit 13 through the bus for storing. In detail, the parity adding circuit 14 reads the audio data of 48 bytes from the buffer circuit 13 in the lower right direction (parallel direction to the straight line M=L) as shown in FIG. 5, and calculates the error correcting signal of, for example, 10 bytes corresponding to the audio data. The parity adding circuit 14 writes the audio data of 48 bytes on the original position in the buffer circuit 13, and further writes subsequently the error correcting code. The same processing is repeated on the every audio data stored in the buffer circuit 13. In detail, for n=1, first the address data stored in the addresses (0, 0), (1, 1), (2, 2), . . . , (31, 31), (32, 0), (33, 1), . . . , (46, 14), (47, 15) is read from the buffer circuit 13, the error correcting code of 10 bytes to the audio data is calculated. The audio data is stored in the same address described herein above, and the error correcting code is stored in the addresses subsequently following the address (47, 15) in lower right direction (48, 16), (49, 17), (49, 18), . . . , (56, 25), (57, 26). Next, the audio data stored in the addresses (0, 1), (1, 2), (2, 3), . . . , (30, 31), (31, 0), (32, 1), (33, 2), . . . , (46, 15), (47, 16) are read from the buffer circuit 13, and the error correcting code of 10 bytes to the audio data is calculated. The audio data is stored in the same address described herein above, and the error correcting code is stored in the addresses subsequently following the address (47, 16) in the lower right direction (48, 17), (49, 18), (49, 19), (56, 26), (57, 27).

The same processing is repeated until the error correcting code to the audio signal stored in the addresses (0, 31), (1, 0), (2, 1), . . . , (31, 30), (32, 31), (33, 0), (34, 1), . . . , (46, 13), (47, 14) is stored in the addresses (48, 15), (49, 16), (50, 17), . . . , (56, 24), (57, 25).

Further, for n=2, first the error correcting code to the audio data stored in the addresses (0, 0), (1, 1), (2, 2), . . . , (46, 46), (47, 47) is stored in the addresses subsequently following the address (47, 47) in the lower right direction (48, 48), (49, 49), (50, 50), . . . , (57, 57), and the error correcting code to the audio data stored in the addresses (0, 1), (1, 2), (2, 3), . . . , (46, 47), (47, 48) is stored in the addresses subsequently following the address (47, 48) in the lower right direction (48, 49), (49, 50), (50, 51), (57, 58). Similarly, the same processing is repeated until the error correcting code to the audio data stored in the addresses (0, 61), (1, 0), (2, 1), . . . , (31, 30), (32, 31), . . . , (46, 45), (47, 46) is stored in the addresses subsequently following the address (47, 46) in the lower right direction (48, 47), (49, 48), (50, 49), . . . , (57, 56).

Accordingly, the parity adding circuit 14 repeats a processing of adding the error correcting code composed of 320 (=10×32) bytes to one block (refer to FIG. 1) audio data composed of 1536 (=48×32) bytes n times, thus combines the audio data composed of 1536×n bytes and the error correcting code composed of 320×n bytes into a one unit structure (the data to be processed by the transmission format generating circuit 15 is generated).

In this embodiment, for example, Reed-Solomon code defined on the Galois field G ($2^8$) is used as the error correcting code. The code length of the Reed-Solomon code is (58, 48), and the code length d is 11. However, the code length of the Reed-Solomon code is not limited to (58, 48), but may be, for example, (38, 32), or others.

After the completion of adding the error correcting code to every audio data stored in the buffer circuit 13 as described herein above, the transmission format generating circuit 15 reads the data stored in the buffer circuit 13 in byte units from the address (0, 0) in the M-direction (in the direction from the top to the bottom). In detail, the transmission format generating circuit 15 reads the data from the buffer circuit 13 in the order described herein under (reading order).

(0, 0), (0, 1), (0, 2), . . . , (0, 32n-2), (0, 32n-1),
(1, 0), (1, 1), (1, 2), . . . , (1, 32n-2), (1, 32n-1)
(2, 0), (2, 1), (2, 2), . . . , (2, 32n-2), (2, 32n-1)
..
..
..
(57,0), (57,1), (57,2), . . . , (57, 32n-2), (57, 32n-1)

The audio data added with the error correcting code is read in the reading order which is different from the writing order to the buffer circuit 13 and thus interleaved.

The transmission format generating circuit 15 adds a synchronous data for synchronizing in the receiver 9 and header in which a necessary in formation is described, for every data quantity equal to the summed data quantity of the audio data and the error correcting code stored in the buffer circuit 13, namely data of 1856 (48×32+10×32) bytes for n=1, and converts it to transmission format data (referred to as simply transmission data for convenience).

The data of 1856 byte unit added with the synchronous data and header as described herein above is simply referred to as a section for convenience. Accordingly, a section is composed of 48×32 bytes of the audio data shown in FIG. 5 and 10×32 bytes of the error correcting code for n=1.

FIG. 6 shows the format of the transmission data (bit stream) outputted from the transmission format generating circuit 15. The transmission data is composed, for example, in part units as shown in FIG. 6A, and each part is composed of n chapters as shown in FIG. 6B. Each chapter is composed of a synch composed of 4 bytes (=32 bits) as the synchronous data, a header composed of 60 bytes (=480 bits), and a section composed of 1856 bytes arranged in the order from the head. The synch is categorized into two types, namely part synch and chapter synch, where a part synch is provided to the head chapter which composes the part, and chapter synchs are provided to non-head chapters in order to detect and distinguish the head of a part from the head of a chapter in the receiver side. For example, 4 bytes pattern is used for the part synch and chapter synch so that the direct current is not concentrated. In detail, for example, when QPSK modulation is performed by the modulation circuit 16, 01111011111111111111111111111111 or 01111011011110110111101101111011 is used as a part synch, and 11111111111111111111111111111111 or 01111011011110110111101111111111 is used as a chapter synch.

A part is therefore composed as shown in FIG. 7A for n of two or more. In detail, a part synch is provided to the head chapter which composes a part, and chapter synchs are provided to other chapters which compose the part. A part is composed as shown in FIG. 7B for n of one. In detail, one chapter composes one part, and a part synch is provided as the synch of the chapter. A chapter synch may be used as the synch of a chapter instead of a part chapter for n of one. In other words, either a part synch or chapter synch may be used.

Figure 8:
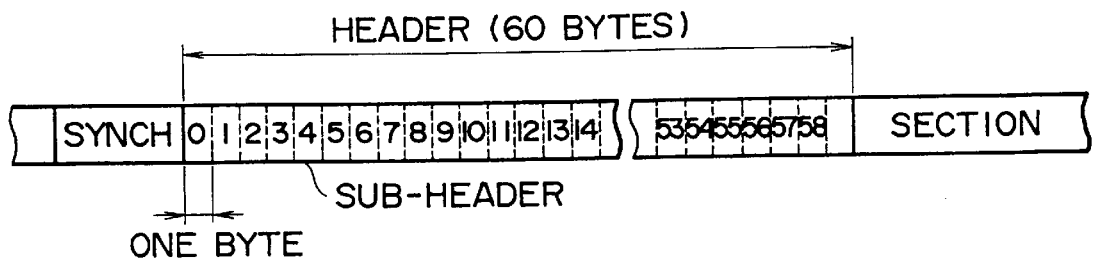
FIG. 8 is a diagram for describing a header.

A header is composed of, for example, 60 subheaders of 1 byte (=8 bits) as shown in FIG. 8, and each subheader carries desired information as required. In detail, the subheaders are numbered from the head as #0, #1, . . . , #59 for identification, then, for example, the number of chapters which composes a part namely n is provided to the subheader #0. For example, the information having relation to the data is provided in the section. In detail, if the data provided in the section is a data, for example, digital audio signal, divided digital audio signal, mixed digital audio signal, video data, or data to be processed by a computer, 0, 1, 2, 3, 4, or 5 is described in the sub-header #1 as a code for indicating the content.

The divided digital audio signal mentioned herein above translates to a plurality of digital audio signals S1, S2, . . . when a plurality of sub-carriers C1, C2, . . . is modulated based on the plurality of digital audio signals S1, S2, . . . and it is transmitted, and the mixed digital audio signal mentioned herein above translates to a plurality of digital audio signals S1, S2, . . . when the plurality of digital audio signals S1, S2, . . . is time-divided and multiplexed, one sub-carrier C is modulated based on the multiplexed signal, and it is transmitted. For example, if the information described in the sub-header #1 represents a divided digital audio signal, information for representing dividing type described hereinafter is described in the sub-header #2. Further, the information for recognizing a plurality of sub-carrier C1, C2, . . . modulated based on the divided digital audio signal namely the respective plurality of digital audio signals S1, S2, . . . is described in the sub-headers #3 and #4.

Further, if the information described in the sub-header #1 represents the video data, the information concerning whether the video data is compressed, and the information concerning the compression system if it is compressed (for example, the information for representing whether the video data is compressed according to MPEG1 system or MPEG2 system, and the information for representing whether the video data is compressed according to the system that JPEG is extended to dynamic picture) are described in the sub-header #2.

The information described in headers is not limited to the examples described herein above. Indeed, information other than those described herein above such as information concerning equipment control information (commands) and other required information may be described as desired.

The transmission data of the format as described herein above is outputted from the transmission format generating circuit 15. As the result, the ratio of data rate of the transmission data and audio data becomes 5/4. In detail, for example, if, addressing on a part, one part is composed of n chapters, then 4×n bytes, 60×n bytes, and 1336×n bytes in the part belongs respectively to synch, header, audio data and error correcting code. It means therefore that the original 1536×n bytes of audio data is changed to 4×n+60×n+1536×n+320×n bytes of transmission data, and accordingly, the ratio of data rate of transmission data (transmission rate) to audio data is 5/4 (=(4×n+60×n+1536×n+320×n)/(1536×n)). As described herein above, the transmission channel clock having a frequency 5/4 data rate of the audio data is supplied from the transmission channel clock generating circuit 12 to the transmission format generating circuit 15, and the transmission format generating circuit 15 is operated based on the transmission channel clock to perform the transmission data processing.

Figure 9:
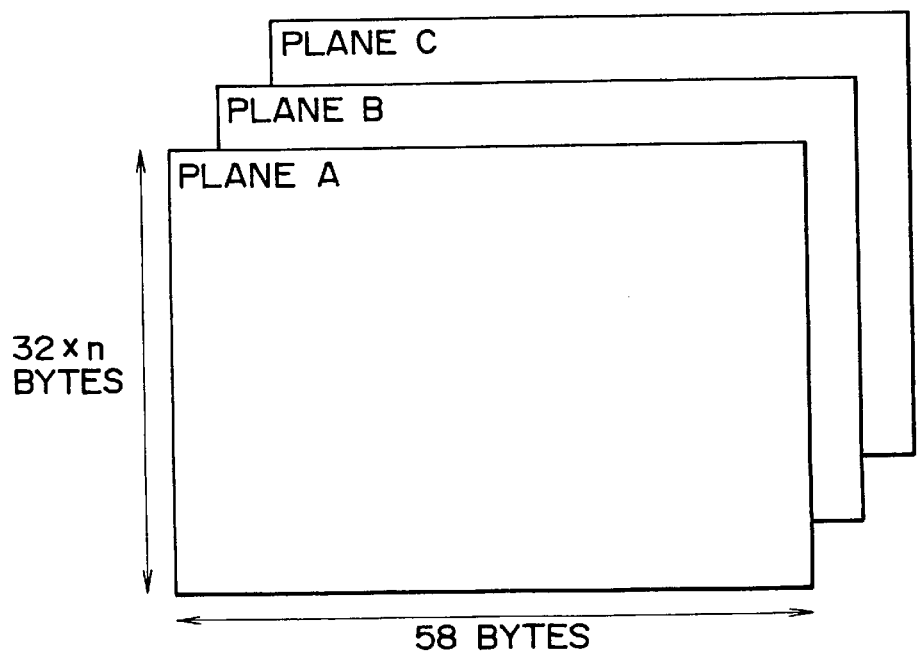
FIG. 9 is a diagram for describing a method for access of an input circuit 11, parity adding circuit 14, and transmission format generating circuit 15 to a buffer circuit 13.

In the embodiment shown in FIG. 3, the input circuit 11, parity adding circuit 14, and transmission format generating circuit 15 are all connected to the buffer circuit 13 through the busy and perform processing with access to the buffer circuit 13. The access timing is described referring to FIG. 9. FIG. 9 shows a structural example of the buffer circuit 13. The buffer circuit 13 has three areas A, B, and C (referred to as a plane hereinafter for convenience) having a memory capacity of 58×32n bytes. The input circuit 11 successively writes the audio data in units of 48×32n bytes on planes A, B, C in the buffer circuit 13 having such structure. Upon completion of writing of the audio data in units of 48×32n bytes by the input circuit 11 to the plane A, the parity adding circuit 14 has an access to the plane A and adds the error correcting code to the stored audio data. Further the parity adding circuit 14 performs the same processing on planes B and C.

Upon completion of the error correcting code addition to the audio data stored on the plane A by the parity adding circuit 14, the transmission format generating circuit 15 has an access to the plane A, reads the data stored therein, and converts it to the transmission data. Further, the transmission format generating circuit 15 performs the same processing on the planes B and C.

Upon completion of reading of the data stored on the plane A out to the transmission format generating circuit 15, the input circuit 11 writes the audio data of 48×32n bytes on the plane A. The same processing is repeated by the input circuit 11, parity adding circuit 14 and transmission format generating circuit 15.

The description returns to FIG. 3. The transmission data outputted from the transmission format generating circuit 15 is supplied to the modulation circuit 16, and the modulation circuit 16 performs phase shift modulation, for example, QPSK modulation or TCM8PSK modulation.

FIG. 10 shows a structural example of the modulation circuit 16 for performing QPSK modulation. The transmission data in the form of a serial data from the transmission format generating circuit 15 is supplied to a serial/parallel converting circuit 21 to convert the data into the parallel data composed of two bit units, namely any one symbol out of (0, 0), (0, 1), (1, 0), and (1, 1). For QPSK modulation, I-data which is the most significant bit (MSB) of the symbol or Q-data which is the less significant bit (LSB) is supplied respectively to one input terminal of EXOR gate 22 or 23.

The random code (random series) is supplied from a random series generating circuit 31 to the other respective input terminal of EXOR gates 22 or 23 at the timing of the transmission channel clock. The exclusive OR of I-data or Q-data and the random code is formed by EXOR gate 22 or 23, and I-data and Q-data are scrambled thereby. It may be possible that I-data and Q-data are not scrambled. In such case, it is not required to provide EXOR gates 22 and 23, random series generating circuit 31, and synch detection circuit 36.

The random series generating circuit 31 comprises M-series generating circuit 32, counter circuit 33, and EXOR 34 and 35, and generates a random code based on M-series generated by M-series generating circuit 32 and a count value of the counter circuit 33.

In detail, M-series generating circuit 32 generates M-series having a bit length (period) of, for example, 17 bits, and supplies it to one input terminal of respective EXOR 34 or 35. The counter circuit 33 increments the count value comprising, for example, 2 bit counter one by one from 00B, 01B, 10B, 11B, 00B, 01B, . . . at the timing of the transmission channel clock supplied from the transmission channel clock generating circuit 12 (B represents that the numerals before the B is the binary number). The most significant bit (MSB) or less significant bit (LSB) of the count value of the counter circuit 33 is supplied to the other input terminal of the respective EXOR 34 or 35.

The exclusive OR of M-series and count value is formed by EXOR gate 34 or 35, and the exclusive OR is supplied respectively to EXOR gate 22 or 23 as the random code.

The M-series generating circuit 32 and counter circuit 33 are initialized at the timing of an initializing signal supplied from the synch detection circuit 36 (an initial value for generating M-series is set in the M-series generating circuit 32 and the count value is reset to 00 B in the counter circuit 33). The synch detection circuit 36 detects a synch from the transmission data (only part synch or both part synch and chapter synch), and outputs an initializing signal at the timing, the initialization of the M-series generating circuit 32 and counter circuit 33 is performed at the timing of the synch. If pseudo-random M-series generated by the Mseries generating circuit 32 is used as the symbol, the information point on the phase plane moves to the position symmetrical with respect to the origin. Otherwise, if the periodical count value generated by the counter circuit 33 is used as the symbol, the information point on the phase plane rotates around the origin. The random code is formed from the pseudorandom M-series and periodical count value, and the exclusive OR is formed, thus the regularity of the transmission data is reduced in the pseudo-form if the symbol is scrambled. As a result, the deviation of the information point on the phase plane is also reduced.

In EXOR gates 22 and 23, the portion other than synch is scrambled. The random series generating circuit 31 judges whether the symbol supplied to EXOR gates 22 and 23 is a synch based on the initializing signal from the synch detection circuit 36, and if it is judged to be a synch, then the random series generating circuit 31 supplies 0 to EXOR gates 22 and 23, and EXOR gates 22 and 23 output the synch as it is.

It is possible to generate the random code in response to some signal other than M-series and periodical count value. It is also possible to scramble by means other than the EXOR gate. I-data and Q-data scrambled by EXOR gates 22 and 23 are both inputted to a differential converting circuit 37. I-data and Q-data are differentially coded by the differential converting circuit 37, and the resulting differential I-data and Q-data are outputted. Assuming that the symbol of the pair of I-data and Qdata is represented by (I, Q), the information points on the phase plane of the differential I-data and Q-data obtained before corresponding to symbols (0, 0), (0, 1), (1, 1), or (1, 0) now supplied are rotated by $\pi/2$ or $3\pi/2$, and I-data or Q-data corresponding to the information points after rotation is outputted respectively as differential I-data or Q-data.

Accordingly, the phase of the modulated signal generated by an adder 30 described hereinafter is rotated by $\pi/2$ or $3\pi/2$ if the symbol is (0, 0), (0, 1), (1, 1) or (1, 0). Only the phase change of the modulated signal is sufficient for demodulation of such modulated signal, it is not required to detect the phase of sub-carrier generated by an oscillator described hereinafter, so-called phase uncertainty is therefore prevented to occur. The I-data and Q-data are not always required to be differentially coded.

The differential I-data or Q-data outputted from the differential converting circuit 37 is supplied respectively to roll off filters 24 or 25. The roll off filter 24 or 25 comprises a low pass filter, and filters the differential I-data or Q-data to output it respectively to the multiplier, 26 or 27. A root roll off filter may be used instead of the roll off filters 24 and 25 in the modulation circuit 16. Because it is required that the overall filter characteristics of the transmission side and receiving side be equalized to the characteristics of roll off filter, if a root roll off filter is used in the transmission side, a root roll off filter also should be provided to the receiving side (demodulation circuit 51 (FIG. 14)). If root roll off filters are provided to both the transmission side and receiving side as described herein above, then the noise resistance can be improved.

A sub-carrier in addition to the differential I-data is supplied from the oscillator 28 to the multiplier 26. The oscillator 28 generates sine wave having, for example, a frequency of 4.5 MHz, and supplies it to the multiplier 26 and a phase shifter 29 as the sub-carrier.

The reason for selecting the frequency of the subcarrier to be 4.5 MHz is described herein under. Since the frequency band range of 3 MHz to 6 MHz is used as the transmission band as described in FIG. 2, the middle frequency of 4.5 MHz (=(3 MHz+6 MHz)/2) should be used so that the transmission band is effectively utilized.

The multiplier 26 multiplies the sub-carrier from the oscillator 28 by the differential I-data and outputs it to the adder 30.

On the other hand, the sub-carrier is supplied in addition to the differential Q-data from the oscillator 28 to the multiplier 27 through the phase shifter 29. The phase shifter 29 rotates the phase of the sub-carrier from the oscillator 28 by $\pi/2$ and outputs it. Thus, the sub-carrier whose phase is different by $\pi/2$ from that of the multiplier 26 is outputted to the multiplier 27. The multiplier 27 multiplies such sub-carrier by the differential Q-data and outputs it to the adder 30. The adder 30 adds the outputs of the multipliers 26 and 27, thus, RF signal that is the modulated signal formed by QPSK-modulating the sub-carrier based on the differential I-data and Q-data is generated. If the audio data is the data in conformity with, for example, IEC-958 format as described herein above, the maximum data rate when it is regraded as data of 32 bits slot is 3.072 Mbps (=48 kHz×32 bits×2) (the data rate is the same as that of the stereo audio data which is 48 kHz sampled and 32 bit quantized). The data rate of the transmission data is 5/4 times the data rate of the audio data as described herein above, namely 3.84 Mbps. The transmission data is processed in 2 bit units as one symbol, and the frequency band of the modulated signal is therefore 1.92 MHz (=3.84 MHz/2).

The above mentioned description is true ideally, but the frequency band of the modulated signal is extended actually by 20% to 30% of the ideal value. If the frequency band is extended by 20% of the ideal value, then the value is 2.304 MHz (=1.92 MHz×1.2).

The modulated signal can therefore be transmitted within the transmission band range from 3 to 6 MHz as described in FIG. 2. With the frequency of the subcarrier at 4.5 MHz in this embodiment, there are rooms of 348 kHz (=(3 MHz–2.304 MHz)/2) at the lower and higher boundaries of the transmission band, the reason of the rooms is described herein under. If the modulated signal as described herein above is transmitted by way of infrared-rays, the receiving side receives extra infrared-rays in addition to the infrared-rays transmitted. The signal in the range from 3 to 6 MHz is required to be therefore extracted from the signal obtained by photoelectric conversion of the received infrared-rays in order to demodulate the modulated signal. Usually a band pass filter is used to demodulate, but it is practically impossible to fabricate such precise band pass filter that passes signals accurately in the range from 3 to 6 MHz. By providing the room to the boundaries of the transmission band as described herein above, a band pass filter can be fabricated easily and the modulated signal is extracted accurately.

Figure 11:
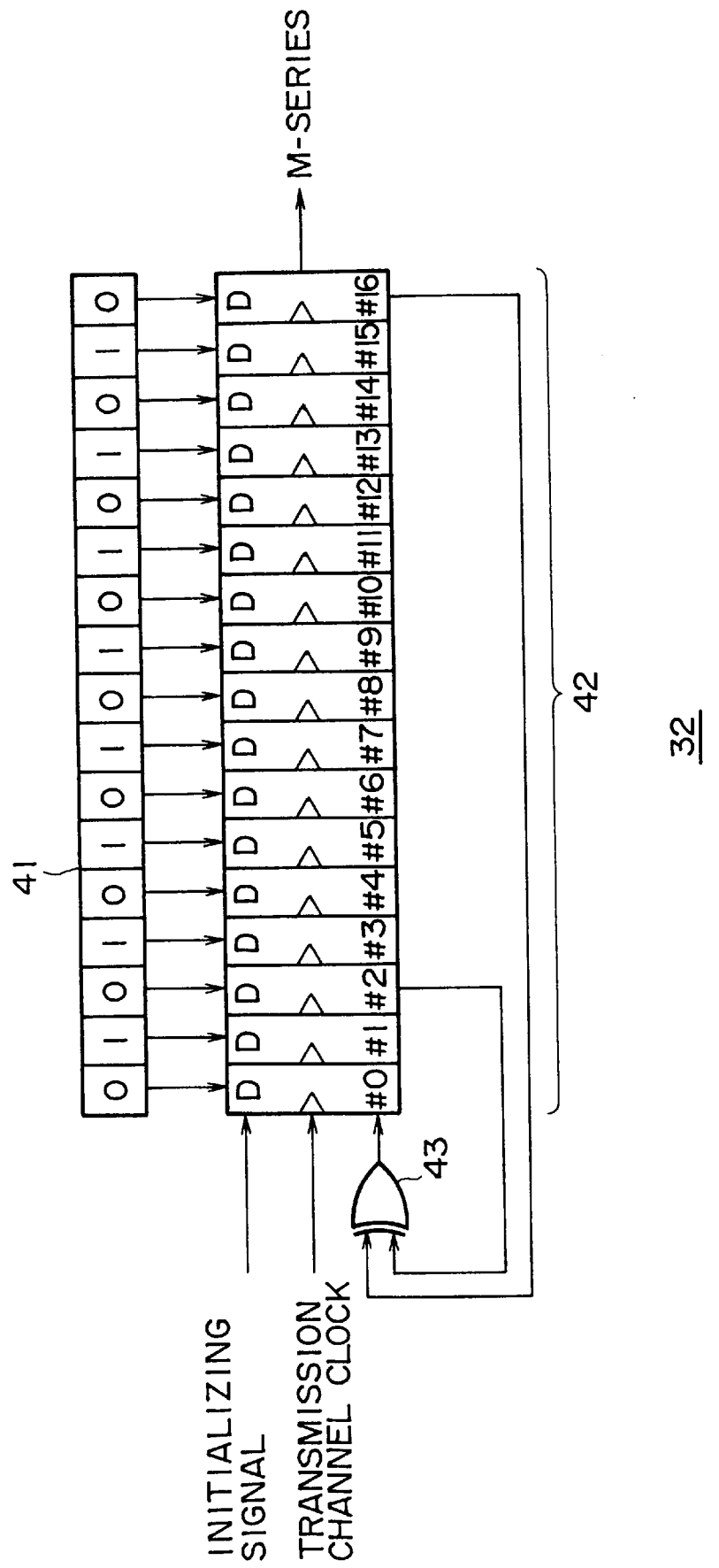
FIG. 11 is a block diagram for illustrating a detailed structural example of a M-series generating circuit 32 shown in FIG. 10.

Next, FIG. 11 shows the structural example of the M-series generating circuit 32 shown FIG. 10. The M-series generating circuit 32 comprises an initial value register 41, D-FF group 42, and EXOR gate 43. The initial value register 41 stores an initial value for generating M-series. The D-FF group 42 comprises series-connected seventeen D-FFs (D flip-flop). The transmission channel clock is supplied to each D-FF as a clock, and latches an input value at the timing of this transmission channel clock. Further, an initialization signal is supplied from the,synch detection circuit 36 (FIG. 10) to each D-FF, and when each D-FF receives the initialization signal, each D-FF latches the initial value stored in the initialization register 41. If the seventeen D-FFs are numbered from the left as #0, #1, . . . , #16 for identification, then the outputs of D-FFs #2 and #16 are supplied to the input terminal of EXOR gate 43, and the output terminal of the EXOR gate 43 is connected to the input terminal of the D-FF #0.

In the M-series generating circuit 32 structured as described herein above, upon receiving the initialization signal, the D-FF group 42 latches the initial value stored in the initial value register 41. In detail, in this embodiment, for example, 01010101010101010B is stored in the initial value register 41 as an initial value, and the D-FFs #0 to #16 latch respectively 0, 1, 0, 1, 0, 1, 0, 1, 0, 1, 0, 1, 0, 1, 0, 1, or 0. Afterwards, the outputs of D-FFs #0 to #15 of the front end are successively latched at the timing of the transmission channel clock respectively in the D-FFs #1 to #16. The EXOR gate 43 calculates a exclusive OR of the outputs of the D-FF #2 and #16, supplies it to the D-FF #0, the D-FF #0 latches the output of EXOR gate 43 at the timing of the transmission channel clock. As described herein above, the pseudo random M-series is outputted from the D-FF #16.

The M-series generating circuit 32 repeats the above-mentioned operations until the M-series generating circuit 32 receives the next initializing signal, and upon receiving the initializing signal, the initial value is latched by D-FFs #0 to #16, and the operations described herein above are repeated again.

In this embodiment, the M-series generating circuit 32 generates the M-series having 17 bit length, but the M-series having another bit length may be generated.

The bit length of M-series may be prescribed so that the period is longer than the length corresponding to the number of bits which composes a section. Accordingly, if a section is composed of 1856 bytes (the case where a section is composed of 1914 bytes as described hereinafter is also processed in the same manner) and one M-series is used for one symbol, namely 2 bits for scrambling as shown in FIG. 6C, then m which satisfies 1856 bytes×8 bits ÷2 bits/symbol <$2^m-1$ may be adopted. Accordingly, the bit length of the Mseries may be 13 bits or more for this case.

Figure 12:
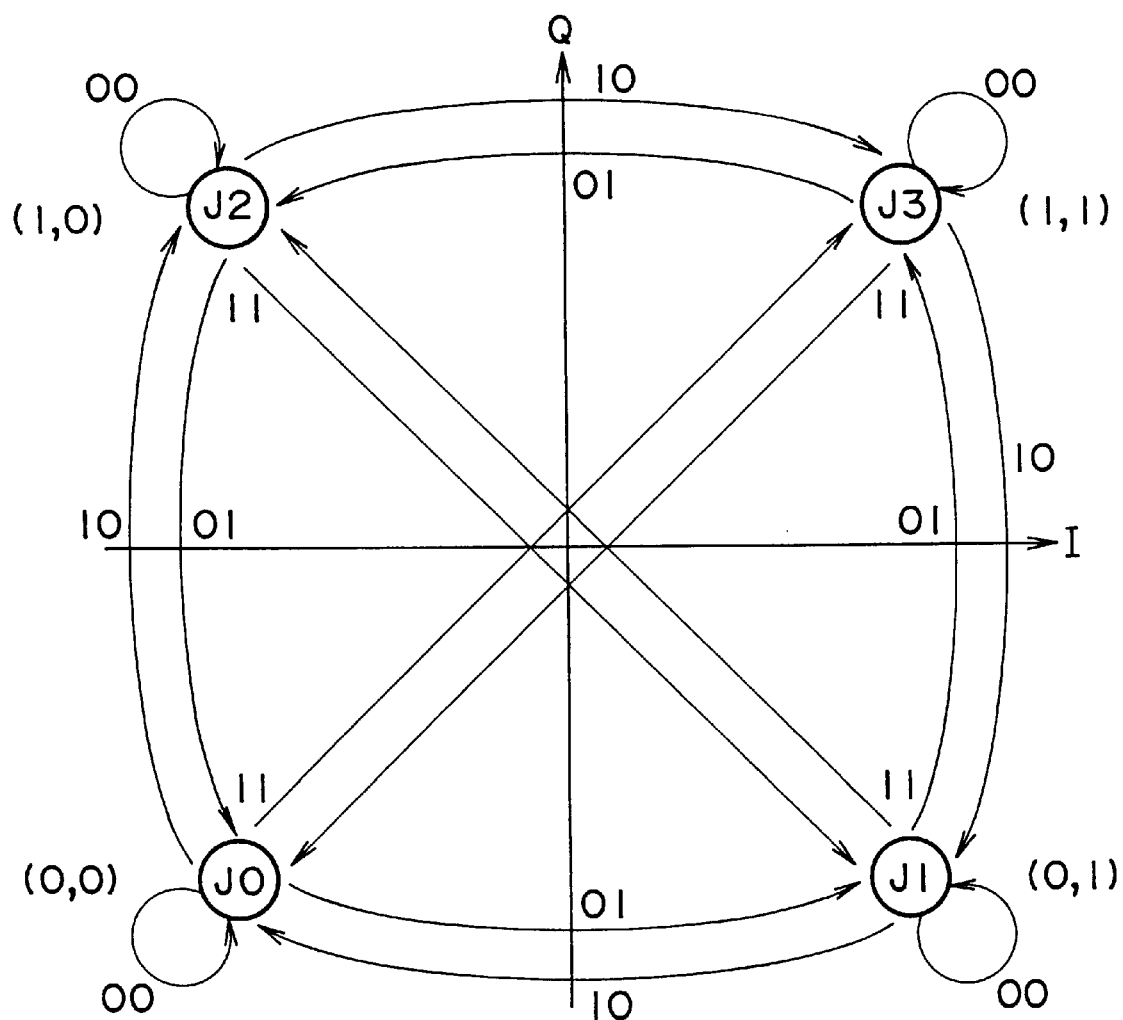
FIG. 12 is a mode transition diagram for describing the motion of a differential converter 37 shown in FIG. 10.

The initial value to be stored in the initial value register 41 may be changed as desired. Next, the operation of the differential converting circuit 37 shown in FIG. 10 is further described in reference to FIG. 12. FIG. 12 shows the condition transition of the differential converting circuit 37. In detail, the differential converting circuit 37 has four modes including J0, J1, J2 and J3. When the I-data and Q-data are inputted, the mode is changed correspondingly to the input value, and further outputs a differential I-data and Q-data corresponding to the mode after the transition. In detail, (0, 0), (0, 1), (1, 0) or (1, 1) is assigned to the mode J0, J1, J2, or J3 as pairs of the differential I-data and Q-data (differential-I, differential-Q) in the embodiment shown in FIG. 12. When the mode is the mode J0, J1, J2 or J3, the input of (0, 0) as the I-data and Q-data does not change the mode. That is, the mode changes to a mode J0, J1, J2, or J3 (self transition), and as a result, (0, 0), (0, 1), (1, 0), or (1, 1) is outputted respectively as the differential I-data and Q-data. If (0, 1) is inputted as I-data and Q-data under the condition of mode J0, J1, J2, or J3, the mode changes to a mode J1, J3, J0, or J2 respectively, and as a result, (0, 1), (1, 1), (0, 0) or (1, 0) is outputted as the differential I-data and Q-data.

If (1, 0) is inputted as I-data and Q-data under the condition of mode J0, J1, J2, or J3, the mode changes to mode J2, J0, J3, or J1 respectively, and as a result, (1, 0), (0, 0), (1, 1), or (0, 1) is outputted as the differential I-data and Q-data. If (1, 1) is inputted as I-data and Q-data under the condition of mode J0, J1, J2, or J3, the mode changes to a mode J3, J2, J1, or J0 respectively, and as a result, (1, 1), (1, 0), (0, 1), or (0, 0) is outputted as differential I-data and Q-data. QPSK modulation by the modulation circuit 16 is described herein above. However, the modulation circuit 16 may perform other modulation, such as, TCM8PSK modulation or phase shift modulation as described hereinbefore. For example, if the modulation circuit 16 performs TCM8PSK modulation, 2 bit output of EXOR gates 22 and 23 in FIG. 10 is replaced with 3 bit output, and 8PSK-modulated in symbol units of 3 bits.

Next, FIG. 13 shows the structural example of the receiver 9 in FIG. 1. The above-mentioned modulated signal is supplied to the receiver 9 through the infrared emitter 7 and infrared detector 8, and inputted to a demodulation circuit 51. The demodulation circuit 51 is structured containing a carrier wave extracting circuit having a so-called costas loop, and provides phase demodulation of modulated signals such as QPSK demodulation or TCM8PSK demodulation, further, performs descrambling processing and other necessary processing, and regenerates transmission data having the format described in FIG. 6. The transmission data is supplied to a transmission channel clock regenerating circuit 52 and transmission format regenerating circuit 54.

The transmission channel clock regenerating circuit 52 regenerates a transmission channel clock based on the transmission data from the demodulation circuit 51, and supplies it to demodulation circuit 51, data clock regenerating circuit 53, transmission format regenerating circuit 54, and frequency check circuit 58. The demodulation circuit 51 and transmission format regenerating circuit 54 perform processing based on the transmission channel clock. The transmission data outputted from the demodulation circuit 51 had scrambled by the modulation circuit 16 as described hereinbefore to result in reduced degree of edge lack. Therefore, false regeneration of transmission channel clock in the transmission channel clock regenerating circuit 52 is prevented (reduced).

The data clock regenerating circuit 53 comprises, for example, a PLL circuit, a frequency dividing circuit, and a multiplying circuit, and regenerates a clock 4/5 times the frequency, namely the clock of the audio data, based on the transmission channel clock from the transmission channel clock regenerating circuit 52. The data clock is supplied to an output circuit 57, an output I/F circuit 59, and other blocks which require the data clock. Thereby, processing is performed at the timing of the data clock in the output circuit 57 and output I/F circuit 59.

A reset signal is supplied from the transmission format regenerating circuit 54 to the data clock regenerating circuit 53, and in the data clock regenerating circuit 53, the clock phase of a built-in PLL circuit is controlled based on the reset signal.

On the other hand, the transmission format regenerating circuit 54 extracts a section from the transmission data outputted from the demodulation circuit 51, and sends it to the buffer circuit 55 having the same structure as the buffer circuit 13 shown in FIG. 3 through the bus for storing. In detail, the transmission format regenerating circuit 54 writes data which compose sections in the buffer circuit 55 in M-direction, and restructures the data block composed of 58×32n bytes including the audio data and error correcting code described in FIG. 5 (referred to as deinterleave block for convenience hereinafter) to deinterleave.

The transmission format regenerating circuit 54 extracts a header from the transmission data, and recognizes the number of sections which compose the deinterleave block by referring to the value of n described therein. The number of sections may be recognized otherwise by detecting, for example, the interval of the part synch.

In the example-described herein above, the number of sections n itself which compose a part is described in a header by the transmitter 6. However, for example, if the possible value of n is limited to n=$2^i$ (wherein i is a integer of zero or larger), the value of i may be described in the header. The number can be expressed with a small number of bits regardless of a large number of sections n which compose a part.

Further, the transmission format regenerating circuit 54 refers to information concerning the data described in the header to recognize the data type provided in the section, and if the data type is digital audio signal, the transmission format regenerating circuit 54 may recognize the number of sections which compose a deinterleave block to be 1 regardless of the value of n described in the header, because n is prescribed to be 1 when the digital audio signal is transmitted as described hereinbefore.

The reason for n being prescribed to be 1 when the digital audio signal is transmitted is described herein under. In particular, n is the value for defining the interleave length, where a larger n results in improved error correcting capability to burst error but, on the other hand, results in the requirement of longer time for deinterleaving. For example, if a dynamic picture and an aural digital audio signal accompanying the dynamic picture are transmitted, the large n results in delayed starting of regeneration of the speech from the starting of regeneration of the dynamic picture. Such delay of speech longer than about 100 ms can be recognized by human ears and the person will hear aural displacement with respect to the dynamic picture. The delay is preferably shorter than about 100 ms, but n=1 is the only way to realize compatibility under the condition of 58×32n byte data section. The transmission format regenerating circuit 54 writes the deinterleave block in the buffer circuit 55 as described herein above, detects the synch in the transmission data, and outputs a reset signal to the data clock regenerating circuit 53 at the timing of the synch. Thereby, the lock phase of the data clock regenerating circuit 53 is controlled as described herein above.

Upon storing of deinterleave block in the buffer circuit 55, the error correcting circuit 56 reads the deinterleave block in the same manner as the parity adding circuit 14 shown in FIG. 3, and performs error correction of the audio data based on the error correcting code. The error correcting circuit 56 writes the error-corrected audio data in the buffer circuit 55.

In the present embodiment, the Reed-Solomon code is used as the error correcting code as described hereinbefore, where the error correcting circuit 56 sets a correcting code distance d for enabling of error detection or error correctable range r to be 11 or 4, and performs error correction within the range. The error correcting circuit 56 outputs a correction impossible signal to an output circuit 57 if the correction of an error is impossible. Upon receiving the correction impossible signal from the error correcting circuit 56, the output circuit 57 stops the output of the audio signal which is read out from the buffer circuit 55 to prevent the audio data which could not be corrected from being outputted.

After the completion of writing of the audio data in the buffer circuit 55 by the error correcting circuit 56, the output circuit 57 reads out the audio data out from the buffer circuit 55 according to the data clock from the data clock regenerating circuit 53, and outputs it to an output I/F circuit 59. The output I/F circuit 59 performs the inverse processing of the input I/F circuit 10 in FIG. 3 to the audio data supplied from the output circuit 57 according to also the data clock, and outputs it to the digital audio apparatus 3.

When the output circuit 57 receives an abnormal signal from the frequency check circuit 58, the output circuit 57 stops the output of audio data, and also, when an abnormal signal is received in addition when an error correction impossible signal is received.

The frequency check circuit 58 judges whether the frequency of the transmission channel clock supplied from the transmission channel clock regenerating circuit 52 is normal, that is, whether the frequency is in conformity with IEC-958 standard in this embodiment, for example, at 3.84 MHz (=48 kHz×32 bits×2×5/4). If the frequency of the transmission channel clock is not normal, the frequency check circuit 58 outputs an abnormal signal for indicating the abnormality to the output circuit 57, and stops the output of audio data from the output circuit 57. Accordingly, the output of abnormal audio data is prevented.

Figure 14:
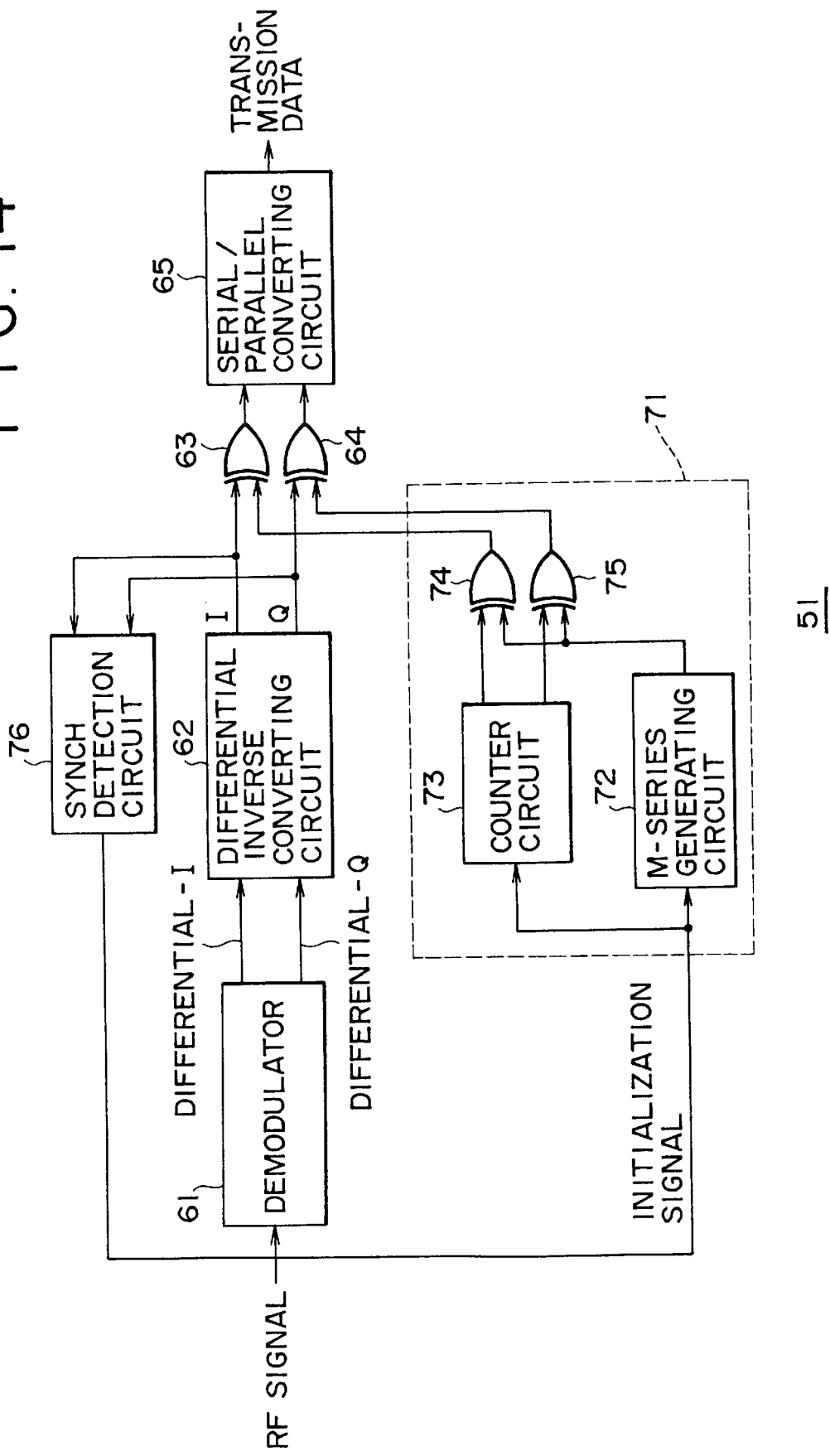
FIG. 14 is a block diagram for illustrating a detailed structural example of a demodulation circuit 51 shown in FIG. 13.

FIG. 14 shows the structural example of the demodulation circuit 51 shown in FIG. 13. The modulated signal (RF signal) from the infrared detector 8 is supplied to a demodulator 61. The demodulator 61 is provided with a carrier wave extracting circuit having a costas loop, detects a sub-carrier from the modulated signal, and performs QPSK demodulation by looking the phase. The differential I-data and Q-data are acquired, and outputted from the demodulator 61 to the differential inverse converting circuit 62. The differential inverse converting circuit 62 regenerates the I-data and Q-data by performing inverse processing of the differential converting circuit 37 in FIG. 10. In detail, the differential inverse converting circuit 62 detects the degrees by which the information point $P_{NOW}$ on the phase plane of the differential I-data and Q-data received now is rotated (rotation in counterclockwise direction) from the information point $P_{PRE}$ on the phase plane of the differential I-data and Q-data received previously. If the information point $P_{NOW}$ is rotated by 0, $\pi/2$, $\pi$, or $3\pi/2$ from the information point $P_{PRE}$, the differential inverse converting circuit 62 inputs (0, 0), (0, 1), (1, 1), or (1, 0) as a pair of I-data and Q-data. Accordingly, the correct I-data and Q-data are acquired based on the phase difference between the information point $P_{NOW}$ and $P_{PRE}$ regardless of the incorrect phase locking of the sub-carrier. The I-data or Q-data is supplied respectively to either EXOR gate 63 or 64. A random code is supplied from the random series generating circuit 71 for generating the same series as the output of the random series generating circuit 31 shown in FIG. 10 respectively to the other terminal of the EXOR gate 63 or 64, and the exclusive OR of I-data or Q-data and the random series are acquired.

For example, the random series generating circuit 71 comprises a M-series generating circuit 72, counter circuit 73, and EXOR gate 74 or 75 which are structured in the same manner as the M-series generating circuit 32, counter circuit 33, and EXOR gate 34 or 35 respectively. An initializing signal is supplied from the synch detection circuit 76 to the M-series generating circuit 72 and counter circuit 73. The I-data and Q-data are supplied to the synch detection circuit 76, and the synch detection circuit 76 detects the synch from the I-data and 0-data (because the synch is not scrambled as described herein above, it can be detected before descrambling), and outputs the initialization signal at the timing. Accordingly, the M-series generating circuit 72 and counter circuit 73 are initialized at the same timing as the M-series generating circuit 32 and counter 33 in FIG. 10, such that the random code generated from the random series generating circuit 71 is the same as that generated from the random series generating circuit 31 in FIG. 10. As a result, EXOR gate 63 or 64 can perform scrambling of I-data and Q-data by calculating the exclusive OR of such random code and I-data or Q-data.

The descrambled I-data and Q-data, namely parallel data of 2 bits, are supplied to a parallel/serial converting circuit 65, and converted therein to a serial data, namely, transmission data, and outputted.

If the differential coding is not performed by the modulation circuit 16 (FIG. 10), a correct I-data and Q-data corresponding to the output of the demodulator 61 are acquired by rotating the information point on the phase plane.

In the embodiment of FIG. 14, the demodulator circuit 51 is provided with the function to perform QPSK demodulation, but if the modulation circuit 16 (FIG. 10) performs TCM8PSK, it is required to provide the demodulation circuit 51 with the function to perform TCM8PSK demodulation for matching.

Figure 15:
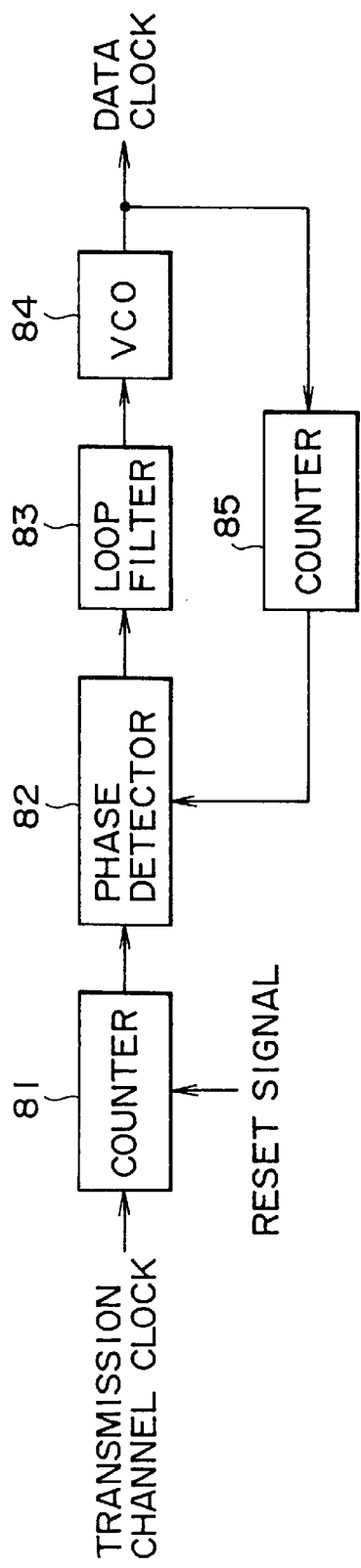
FIG. 15 is a block diagram for illustrating a detailed structural example of a PLL circuit built in a data clock regenerating circuit 53 shown in FIG. 13.

Next, FIG. 15 shows the structural example of a PLL circuit built in the data clock regenerating circuit 53 shown in FIG. 13. The transmission channel clock from the transmission channel clock regenerating circuit 52 is supplied to a counter (or pre-scaler) 81. The counter 81 counts the transmission channel clock, and outputs a pulse when the count value reaches a prescribed value. When, the counter 81 resets the count value to 0, it starts counting of the transmission channel clock. The counter 81 performs frequency dividing of the transmission channel clock by repeating the same operations. For purposes of convenience, the pulse outputted from the counter 81 is referred to as frequency dividing transmission channel clock. The counter 81 receives a reset signal from the transmission format regenerating circuit 54, and the counter 81 resets the count value also when the reset signal is received.

The frequency dividing transmission channel clock outputted from counter 81 is supplied to a phase detector 82. An output from a counter 85 in addition to the frequency transmission channel clock is also supplied to the phase detector 82. The phase detector 82 compares the phase of the output of the counter 85 with the frequency dividing transmission channel clock, and a voltage corresponding to the phase difference (referred to as phase difference voltage for convenience) is outputted to a loop filter 83.

The loop filter 83 removes the harmonic component from the phase difference voltage supplied from the phase detector, and outputs it to VCO (voltage control oscillating circuit) 84. The VCO 84 generates a clock corresponding to the phase difference voltage from the loop filter 83. The clock is supplied to the counter 85 having the same structure as the counter 81. The counter 85 performs frequency dividing of the clock from the VCO 84 like the counter 81.

By operations described above, the VCO 84 outputs the clock which makes the frequency of the frequency transmission channel clock outputted from the counter 81 and the frequency of the clock outputted from the counter 85 equal.

The reset signal is supplied to the counter 81 and the count value of the counter 81 is reset, thereby, the phase of the clock outputted from the VCO 84 is controlled.

A certain time is required to lock the PLL circuit as described herein above, the time is determined by the circuit characteristics of the PLL circuit, if the time is too short, the deviation in the time axis direction, namely jitter, occurs on the clock outputted from the PLL circuit (data clock). Increased jitter will cause the degradation of the quality of, for example, the audio data. On the other hand, if the time for locking the PLL circuit is long, the PLL circuit is not locked for a long time even if, for example, the transmission line between the infrared emitter 7 to the infrared detector 8 is shut down temporarily, after the line resumes transmission, and the infrared detector 8 receives infrared-rays from the infrared emitter 8, no locking causes interruption of the audio data output, and a user will feel incompatibility. To prevent such interruption, the loop filter 83 is provided with a time constant which adjusts the time for locking of the PLL circuit in the range of from, for example, about 1 ms to 500 ms, because it is experimentally confirmed that a user does not feel incompatibility and the tone quality is satisfactory if the time for locking of the PLL circuit is adjusted to the value described herein above.

Figure 16:
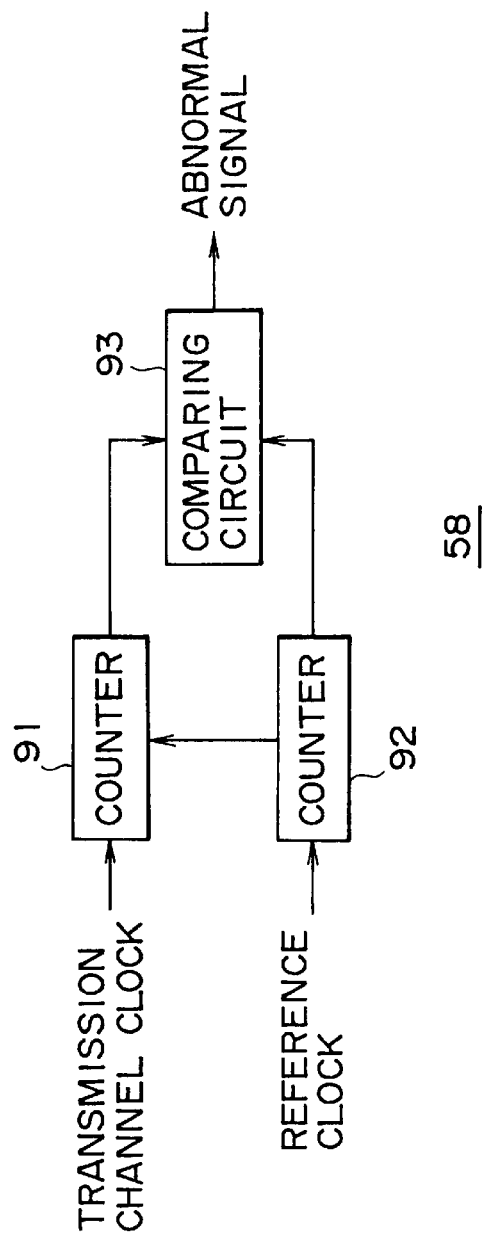
FIG. 16 is a block diagram for illustrating a detailed structural example of a frequency checking circuit 58 shown in FIG. 13.

Next, FIG. 16 shows the structural example of the frequency check circuit 58 shown in FIG. 13. The transmission channel clock is supplied from the transmission channel clock regenerating circuit 52 to a counter 91, the count value is incremented one by one at the timing of the transmission channel clock and inputted to a comparing circuit 93.

A counter 92 receives a clock having the same frequency as the transmission channel clock (in this embodiment, it is a clock of 3.84 MHz) or a clock having an independent frequency capable of examining the correctness of the transmission channel clock. The counter 92 increments the count value one by one at the timing of the clock and outputs it to the comparing circuit 93.

The counter 92 resets the count value to, for example, 0 at the desired timing (for example, when the count value reaches a desired value), and outputs a reset signal to the counter 91 at the same timing. Upon receiving the reset signal from the counter 92, the counter 91 resets the counter value to, for example, 0. Both counters 91 and 92 are therefore reset simultaneously.

The comparing circuit 93 compares the count value of the counter 91 with the count value of the counter 92. The comparing circuit 93 judges whether the difference between the count value of the counter 91 and the count value of the counter 92 (or ratio of these values) is included in a prescribed error range. If the difference between the count value of the counter 91 and the count value of the counter 92 is not included in the prescribed error range, that is, for example, if an infrared-ray received by the infrared detector 8 is not the infrared-ray emitted from the infrared emitter 7 and therefore the count value of the counter 91 significantly deviates from the count value of the counter 92 comparatively, the comparing circuit 93 judges the signal outputted from the transmission channel clock regenerating circuit 52 to be not a normal transmission channel clock, and outputs an abnormal signal to the output circuit 57.

As described herein above, the output circuit 57 stops outputting of the audio data while the abnormal signal is being received, and prevents the abnormal audio data from being outputted.

Figure 17:
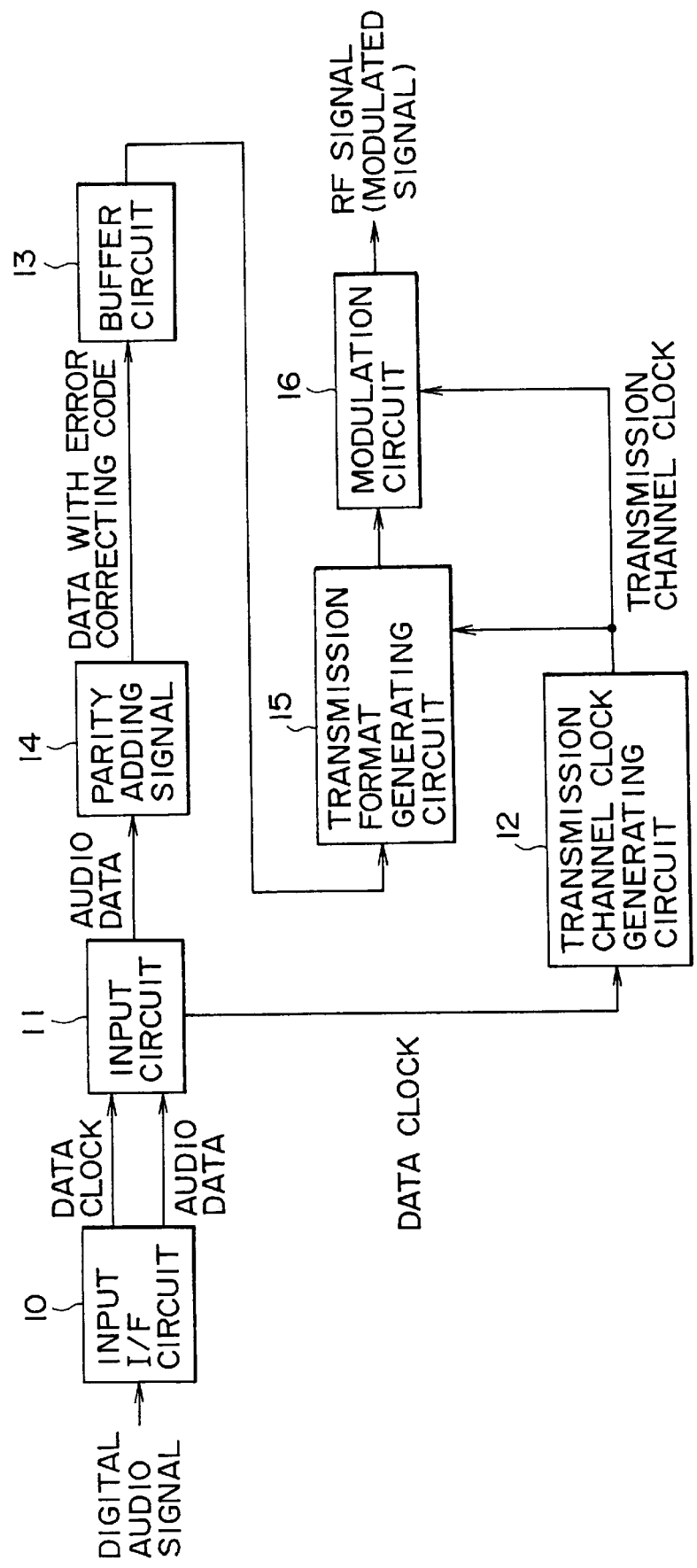
FIG. 17 is a block diagram for illustrating another structural example of a transmitter 6 shown in FIG. 1.

Next, FIG. 17 shows the structural example of the transmitter 6 shown in FIG. 1. In the figure, the components in FIG. 17 having basically the same function as shown in FIG. 3 are given the same properties, and the description is omitted for convenience. In FIG. 3, the input circuit 11, parity adding circuit 14, and transmission format generating circuit 15 are connected to the buffer circuit 13 through the bus. These components perform processing by having access to the buffer circuit 13. However, in FIG. 17, the input circuit 11, parity adding circuit 14, buffer circuit 13, and transmission format generating circuit 15 are connected in series, and processing is performed in a pipeline manner.

Figure 18:
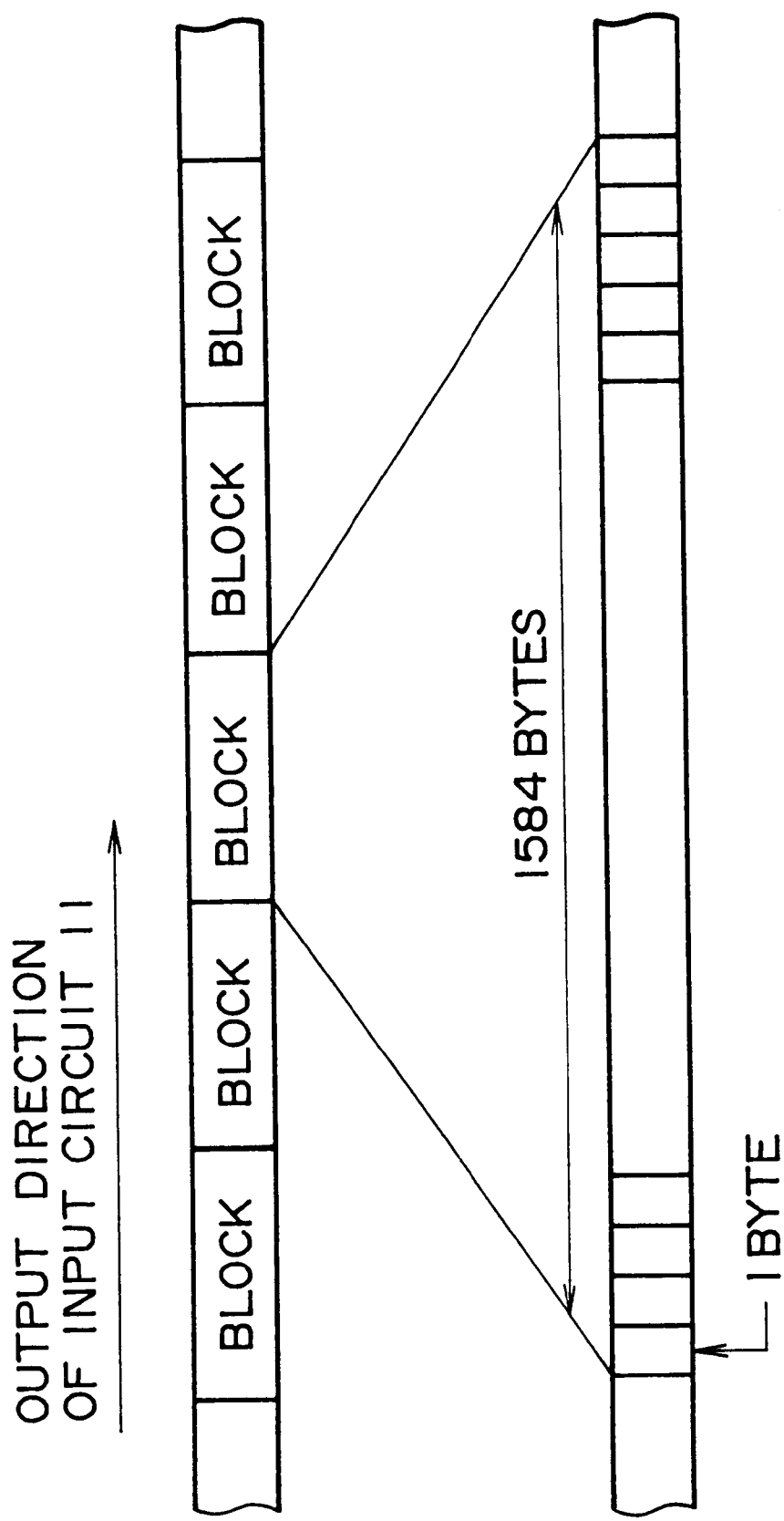
FIG. 18 is a diagram for illustrating the format of an audio data outputted from an input circuit 11 shown in FIG. 17.

In detail, the input I/F circuit 10 supplies the audio data having a format, for example, as shown in FIG. 18 to the input circuit 11. In further detail, in this embodiment, the input I/F circuit 10 outputs a bit stream composed of a unit of a block composed of 1584 byte audio data which is more than that in FIG. 4 (1536 bytes) by 48 bytes to the input circuit 11.

The input circuit 11 supplies the audio data from the input I/F circuit 10 to the parity adding circuit 14 in byte units, for example. The parity adding circuit 14 receives the audio data from the input circuit 11 in byte units, and calculates an error correcting code of, for example, 10 bytes corresponding to the 48 byte audio data when for example the 48 byte audio data are received. In the parity adding circuit 14, the above-mentioned processing is repeated for each time an audio data of 48 bytes from the input circuit 11 is received.

Figure 19:
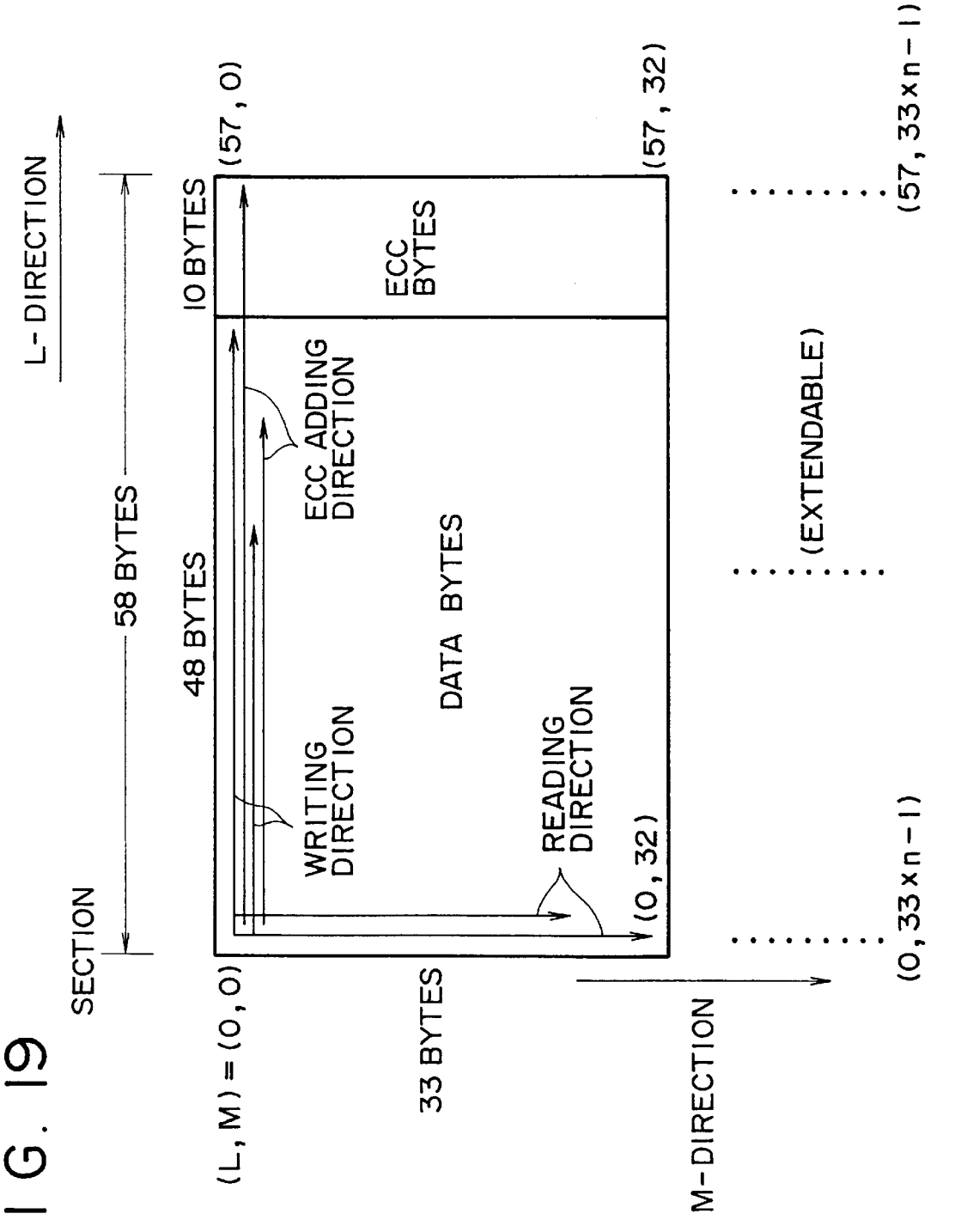
FIG. 19 is a diagram for describing methods for data wiring in and reading from an buffer circuit 13 shown in FIG. 17.

The output of the parity adding circuit 14 is stored in the buffer circuit 13 in byte units. In detail, the buffer circuit 13 stores the output from the parity adding circuit 14 in L-direction for example, in byte units as shown in FIG. 19. The buffer circuit 13 stores data of 58 bytes composed of audio data of 48 bytes and error correcting code of 10 bytes (the 58 byte unit data is referred to as line data for convenience hereinafter) on the top line, then stores the next line data in L-direction on the second line. The buffer 13 repeats the same processing until line data of 33×n bytes in M-direction are stored.

Accordingly, the output of the parity adding circuit is written in the buffer circuit 13 in the order described herein under.

(0, 0), (1, 0), (2, 0), . . . , (56, 0), (57, 0),
(0, 1), (1, 1), (2, 1), . . . , (56, 1), (57, 1),
(0, 2), (1, 2), (2, 2), . . . , (56, 2), (57, 2),
••
••
••
(0, 32), (1, 32), (2, 32), . . . , (56, 32), (57, 32)
••
••
(0, 33n-1), (1, 33n-1), (2, 33n-1), . . . , (56, 33n-1), (57, 33n-1)

As described herein above, the line data is stored in units of 58×(33×n) bytes in the buffer circuit 13.

In FIG. 5 described hereinbefore, the addition of the error correcting code of 320 bytes (10×32) to the audio data of 1536 (=48×32) types which compose 1 block is repeated n times to structure the audio data of 1536×n bytes and error correcting code of 320×n types into one unit in the parity adding circuit 14. However, in FIG. 18, one block is composed of audio data of 1584 (=48×33) bytes. Therefore, in this case, the parity adding circuit 14 structures the audio data of 1584 (=48×33)×n bytes and error correcting code of 330 (=10×33)×n bytes into one unit.

Upon the audio data of 1584×n bytes and error correcting code of 330×n bytes being stored in the buffer circuit 13 as described herein above, the transmission format generating circuit 15 reads the data out from the buffer circuit 13 in the same manner as described in FIG. 5. In detail, the transmission format generating circuit 15 reads the data stored in the buffer circuit 13 from the address (0, 0) in M-direction in byte units.

In detail, the transmission format generating circuit 15 read the data out from the buffer circuit 13 in the order described herein under (reading order).

(0, 0), (0, 1), (0, 2), . . . , (0, 33n-2), (0, 33n-1),
(1, 0), (1, 1), (1, 2), . . . , (1, 33n-2), (1, 33n-1),
(2, 0), (2, 1), (2, 2), . . . , (2, 33n-2), (2, 33n-1),
••
••
••
(57, 0), (57, 1), (57, 2), . . . , (57, 33n-2), (57, 33n-1)

Accordingly, in this embodiment, the data is read and written in different writing order and reading order, thereby being interleaved.

The transmission format generating circuit 15 regards the data quantity equal to the data quantity of the audio data and error data stored in the buffer circuit 13 for n=1, namely, in this embodiment, the data of 1914 bytes (the audio data of 48×33 bytes and error correcting code of 10×33 bytes), as one section, and adds a part synch or chapter synch as the synchronizing data and a header to every sections.

Accordingly, a section is composed of audio data of 48×33 bytes and error correcting code of 10×32 bytes shown in FIG. 19 for n=1.

FIG. 20 shows the format of the transmission data (bit stream) outputted from the transmission format generating circuit 18. The transmission data is composed of, for example, a part unit (FIG. 20A) like the structure shown in FIG. 6, and each part is composed of n chapters (FIG. 20B). A chapter is composed of a 4 byte synch, 2 byte (=16 bits) header, and 1914 type section in the order from the head as shown in FIG. 20C. In FIG. 6C, a header is composed of 60 bytes as shown in FIG. 21A, but in FIG. 20C, a header is composed of 2 bytes which is less than that by 58 bytes. A section is composed of 1914 bytes which is more than that by 58 bytes. In the embodiment shown in FIG. 17, the transmission format generating circuit 15 inputs a transmission data having the format as described herein above, and as a result, the ratio of the data rate of the transmission data to the data rate of the audio data is 5/4. For example, now referring to on a part, and assuming one part is composed of n chapters, the part includes synchs of 4×n bytes, headers of 2×n bytes, audio data of 1584×n bytes, and error correcting codes of 330×n bytes. Because the data of 1584×n becomes the transmission data of 4×n+2×n+1584×n+330×n bytes, the ratio of the data rate (transmission rate) of the transmission data to the data rate of the audio data is 5/4 (=(4×n+2×n+1584×n+330×n)/(1536×n).

Figure 22:
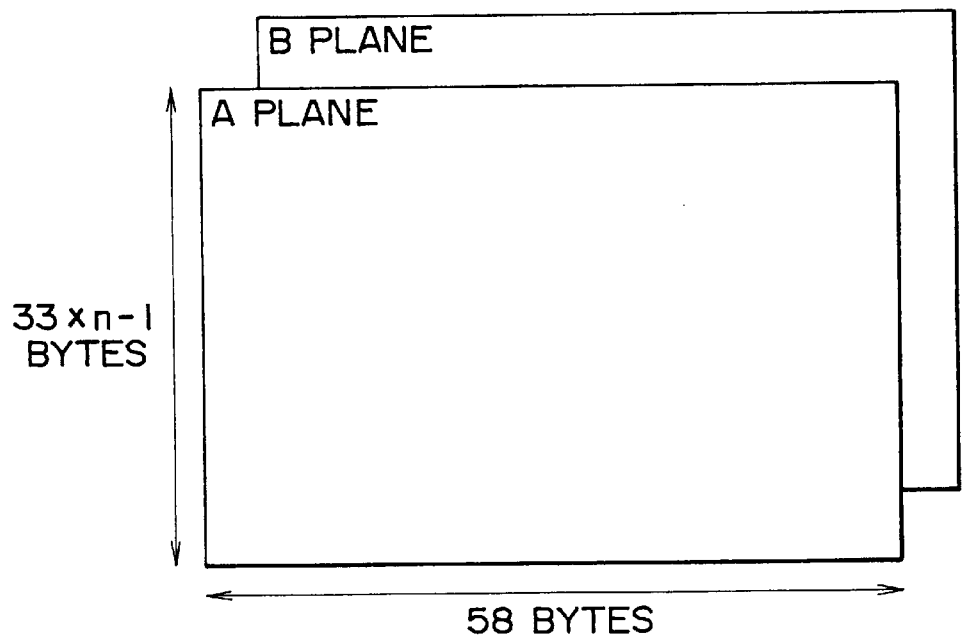
FIG. 22 is a diagram for describing an method of access of a parity adding circuit 14 and transmission format generating circuit 15 to the buffer circuit 13.

In the embodiment shown in FIG. 17, the buffer circuit 13, parity adding circuit 14, and transmission format generating circuit 15 are connected in series as described herein above differently from those connected through the bus shown in FIG. 3, such that the connection shown in FIG. 17 allows the parity adding circuit 14 and transmission format generating circuit 15 to take access directly to the buffer circuit 13 and allows those to perform processing in the so-called pipe line manner. The access timing is described referring to FIG. 22. FIG. 22 shows the structural example of the buffer circuit 13. The buffer circuit 13 has two areas (plane) A and B having 58×33n bytes memory capacity, respectively. The parity adding circuit 14 writes the data of total 58×33n bytes composed of audio data of 48×33n bytes and error correcting code of 10×33n bytes by one unit successively to the planes A and B in the buffer circuit 13 having the structure as described herein above.

After the completion of the writing of the data on the plane A, the transmission format generating circuit 15 accesses to the plane A to read the data stored thereon and converts it to the transmission data. Further, the transmission format generating circuit 15 performs the same processing on the plane B.

After the reading of the data stored on the plane A out to the transmission format generating circuit 15, the parity adding circuit 14 writes the next data of 58×33n bytes on the plane A. In the parity adding circuit 14 and transmission format generating circuit 15, the same processing is repeated.

As described in FIG. 19, the error correcting code is added to the audio data in the parity adding circuit 14 in the same direction as the writing direction of the audio data in the buffer circuit 13. Therefore, the memory capacity corresponding to at least two planes A and B is therefore sufficient for the buffer circuit 13, the cost of the apparatus can be lowered and the size can-be minimized in comparison with the apparatus which requires the memory capacity corresponding to at least three planes A, B, and C as shown in FIG. 9.

The transmission data acquired in the transmission format generating circuit 15 is outputted to the modulation circuit 16, and the modulation circuit 16 performs the same processing as shown in FIG. 3.

The transmission data outputted from the transmission format generating circuit 15 shown in FIG. 17 has a header having 58 less bytes than the transmission data outputted from the transmission format generating circuit 15 shown in FIG. 3, but has a section having 58 more bytes. In the section, the error correcting code of 10 bytes is added to the audio data of 48 bytes, and, therefore, the data of 48 bytes which cannot be provided to a header can be provided to a section.

FIG. 23 shows the bit stream of IEC-958 format (audio data). The bit stream of IEC-958 format is composed of block units as shown in FIG. 23A, and each block is composed of 192 frames as shown in FIG. 23B. Each frame is composed of two sub-frames as shown in FIG. 23C, and each sub-frame is composed of preamble, 24 bits audio sample word, validity flag V, user data U, channel status C, and parity bit P provided in the order successively from the head as shown in FIG. 23D.

The preamble is a special pattern for synchronization and categorized into three types represented by B, W, and M. Data to be transmitted (amplitude of the audio signal) is provided to the 24 bit audio sample word. The validity flag V indicates whether the value provided to the audio sample word is the amplitude value of the true audio signal, and only when the value is not the amplitude of the true audio signal, a 1 is assigned to the value, and for other cases, a 0 is assigned to the value. The user data U is used if the data which is desired by a user is transmitted. The channel status C is used for transmission of the audio sample word length, existence of pre-emphasis, sampling frequency, time code, source number, and destination code. The parity bit P is used for detecting error.

Herein, if the validity flag V, user data U, channel status C, and parity bit P are referred to as control information, and if the audio data outputted from a digital audio apparatus (FIG. 1) is a data in conformity with IEC-958 format, the control information is included therein. It may be considered that the control information provided, for example, in the header is transmitted. However, because the error correcting code is not included in the header in such a case, the control information will be lost if an error occurs in the header. A method which involves the header containing the error correcting code may be considered to prevent the control information from being lost.

However, it is required for realizing this method to provide a means or processing step for adding the error correcting code to the header in addition to the section.

To solve this problem, the control information may be provided to the 48 bytes allocated newly to the section. In such manner, because the error correcting code is added without addition of extra hardware and software, the error correction is made possible without an increase in cost and scale up of the apparatus.

Extraction of the control information from the audio data of IEC-958 format, rearrangement of the data, and other processing are required if the control information is provided at the head of a section, where such processing is performed by the input I/F circuit 10.

Figure 24:
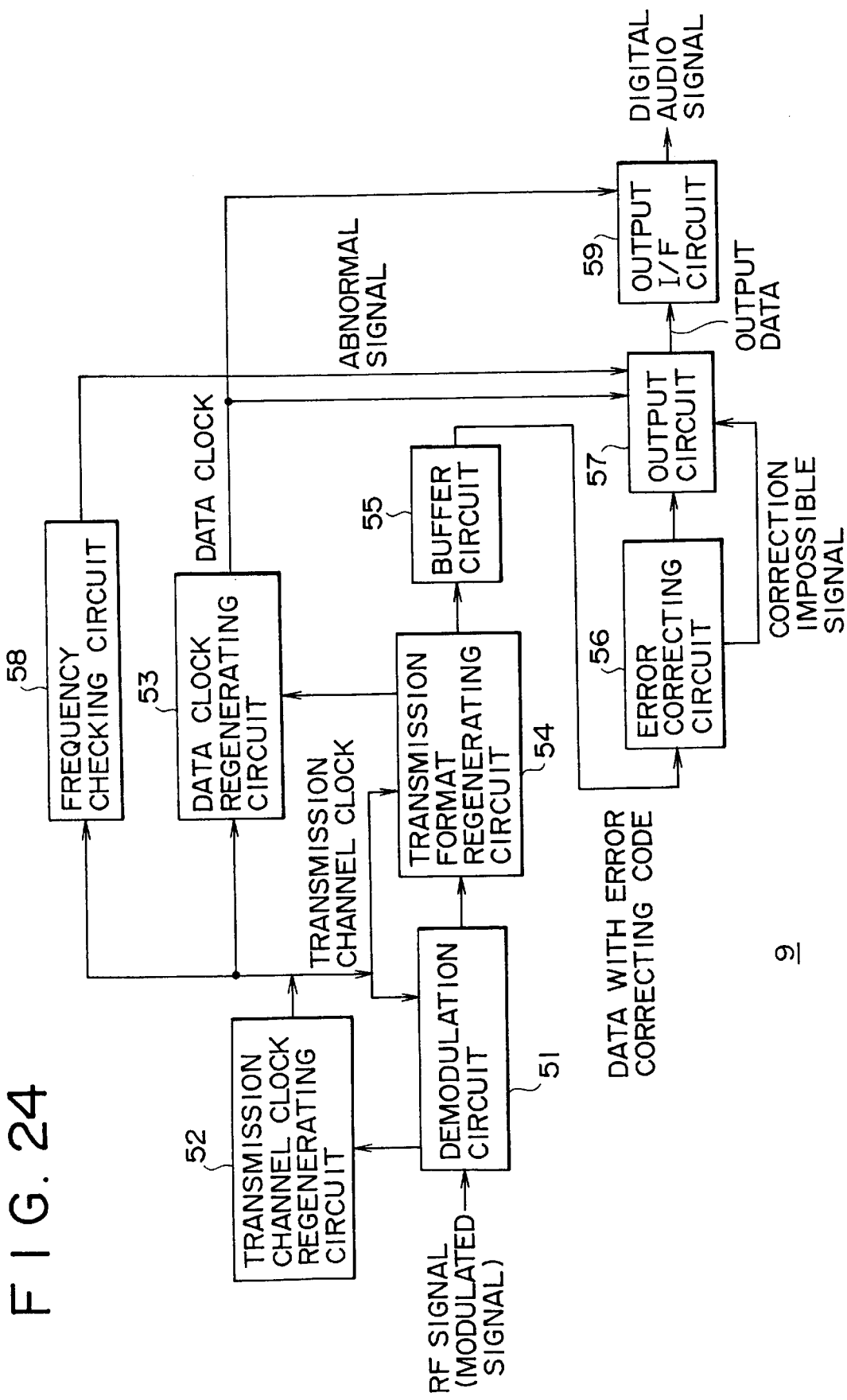
FIG. 24 is a block diagram for illustrating another structural example of a receiver 9 shown in FIG. 1.

Next, FIG. 24 shows the structural example of the receiver 9 shown in FIG. 1 corresponding to the transmitter 6 having the structure as shown in FIG. 17. The components shown in the figure having basically the same function as those shown in FIG. 13 are given the same properties, and descriptions thereof are omitted. While in FIG. 13, the transmission format generating circuit 54, error correcting circuit 56, and output circuit 57 are connected to the buffer circuit 55 through the bus and processing is performed by having an access to the buffer circuit 55, but in FIG. 24, the transmission format regenerating circuit 54, buffer circuit 55, error correcting circuit 56, and output circuit 57 are connected in series and processing is performed in a pipeline manner.

In detail, the transmission format regenerating circuit 54 extracts the section from the demodulation circuit 51, and stores it in the buffer circuit 55 which is similarly structured to the buffer circuit 13 shown in FIG. 17. The transmission format regenerating circuit 54 writes the data which composes the section in the buffer circuit 55 in M-direction, thereby restructuring the data block of 58×33n bytes comprising the audio data and error correcting code described in FIG. 19 namely deinterleave block, and performing deinterleave operation.

Upon completion of storing the deinterleave block in the buffer circuit 55, the error correction circuit 56 reads the deinterleave block in L-direction and corrects errors of the audio data based on the error correcting code. The error correcting circuit 56 then supplies the error-corrected audio data to the output circuit 57.

The output circuit 57 receives the audio data from the error correcting circuit 56 referring to the data clock from the data clock regenerating circuit 53, and outputs it to the output I/F circuit 59. The output I/F circuit 59 performs format conversion processing of the audio data outputted from the output circuit 57, namely, rearrangement of the control information, and the audio data the format of which is converted to the original format is outputted to the digital audio apparatus 3.

As described herein above, because the audio data in conformity with IEC-958 is subjected to QPSK modulation or TCM8PSK modulation, and transmitted with timing of the transmission channel clock having a frequency 5/4 times the data clock, the audio data can be efficiently transmitted by way of infrared-rays with less data processing complexities for modulation and demodulation using, for example, a frequency band range from 3 to 6 MHz within a range from 2 to 6 MHz specified by CP-1205 of EIAJ and IEC-1603.

Though the signal format used for audio data transmission by way of infrared-rays is not common for manufacturers, if the signal format used for audio data transmission by way of infrared-rays which is efficient as described hereinbefore is adopted as the standard, it is possible to provide a compatible system.

The present invention is described herein above referring to application to an audio system for transmission of a digital audio signal, but the present invention can be applied to all transmission apparatuses for transmitting a modulated signal by way of infrared-rays as already described in the description in which modulated signal is generated by digital phase modulation (phase shift modulation) of, for example, digital video signal (video data) or digital signals other than digital audio signal.

The audio data is QPSK modulated or TCM8PSK modulated for transmission in the embodiment, but the audio data may be modulated otherwise, for example, BPSK (Binary Phase Shift Keying) modulated, QAM (Quadrature Amplitude Modulation)-modulated, or other phase shift-modulated for transmission.

The scramble is performed by the modulation circuit 16 in the embodiment, but the scramble may be performed by, for example, the transmission format generating circuit 15. Similarly, the scramble may be performed by, for example, the transmission format regenerating circuit 54 instead of the demodulation circuit 51. The method of scrambling is not limited to the method described in the embodiment.

The receiver 9 checks whether the transmission channel clock outputted from the transmission channel clock regenerating circuit 52 is normal in the embodiment, but the receiver 9 may check the data clock outputted from the data clock regenerating circuit 53 instead of the transmission channel clock. Because the data clock is generated by the data clock regenerating circuit 53 based on the transmission channel clock, the checking of the data clock is similarly effective to the checking of the transmission channel clock.

The data clock phase is controlled by resetting the PLL circuit (FIG. 15) built in the data clock regenerating circuit 53 in the embodiment, but the data clock phase may be controlled by applying a PLL circuit having the same structure as the PLL circuit shown in FIG. 15 in the transmission channel clock regenerating circuit 52. Generation of jitter in transmission channel clock outputted from the transmission channel clock regenerating circuit 52 is prevented by using this structure. The PLL circuit to be built in the transmission channel clock regenerating circuit 52 is preferably prescribed so that the time required for locking is ranged to be in the same range from about 1 ms to 500 ms as that for the PLL circuit built in the data clock regenerating circuit 53.

The random series generating circuit 31 (similar to the random series generating circuit in 71) generates the random code using M-series in the embodiment, but a series other than M-series may be used. Otherwise, a random code may be generated by exclusive OR of M-series and another series. The transmission channel clock is not supplied to the parity adding circuit 14 in FIG. 3 and FIG. 17 in the embodiment, but it may be possible that the transmission channel clock be supplied to the parity circuit 14 and the parity circuit 14 operated with the timing thereof.

The transmitter 3 and infrared emitter 7 are structured separately in the embodiment, but the transmitter 3 and infrared emitter 7 may be structured into a single body. Similarly, the infrared detector 7 and receiver 9 may be also structured into a single embodiment.

The distance d of error correcting code or error correctable range r for enabling error detection is prescribed respectively to 11 or 4 for performing error correction in the range in the error correcting circuit 56 in the embodiment, but the distance d of the error code and error correctable range r may not be limited to those as far as the equation d>2 is satisfied.

The audio data is transmitted using the frequency band of a range from 3 to 6 MHz in the embodiment, but the audio data may be transmitted using another frequency band.

Interleave process is performed by differentiating the direction of data writing from data reading in the buffer circuit 13 for enhancing the burst error resistance in the embodiment, but interleave may not be performed by, for example, equalizing the direction of data writing to the direction of data reading in the buffer circuit 13. In detail, inherently, interleave process is capable of error correction by dispersing errors. However, if, for example, the audio data is compressed and an error occurs in the part where information essential for decoding is concentrated, all audio data which require the information can be decoded by interleaving regardless of the dispersed errors. In such case, the audio data can not be acquired for a long time. On the other hand, if interleave is not performed, because information required for decoding will not be concentrated, only the audio data which uses that information cannot be decoded in the event of an error in such information. As a result, the long time interruption of audio data is prevented. The multiplied stereo audio signal having a data rate of 3.072 Mbps in conformity with IEC-958, for example, multiplied audio signal of L-channel audio signal with R-channel audio signal having a data rate of 1.536, is transmitted by way of one carrier (sub-carrier having a frequency of 4.5 MHz in the embodiment) in the embodiment. But, for example, a signal which is not multiplied, or a signal generated by multiplying three signals may be transmitted by way of one carrier.

Otherwise, two or more signals may be transmitted using two or more carriers. In detail, the frequency band from 3 to 6 MHz is divided into two or more bands (channels) and two or more signals are transmitted using respective bands.

If QPSK modulation processing which processes 2 bits as one symbol is performed on the data and the data rate ranges in a range up to about 3.072 Mbps, the band pass filter in the receiver side is manufactured easily and modulated signal is retrieved correctly. For example, the frequency band division which makes the sum of data rate 3.072 Mbps or less is described herein under (in the following description, assuming that the frequency band with no division is considered as a frequency band divided by one, and such frequency band is included in the frequency division).

0: 3.072 Mbps×1 band
1: 1.536 Mbps×2 bands
2: 768 kbps×4 bands
3: 1.536 Mbps×1 band+768 kbps×2 bands
4: 384 kbps×8 bands
5: 1.536 Mbps×1 band+384 kbps×4 band
6: 192 kbps×16 bands
7: 144 kbps×20 bands
8: 1.536 Mbps×1 band+144 kbps×10 bands
9: 96 kbps×32 bands Numerals on the left hand side of colon (:) are given for identification of frequency band division methods, and referred to as division type hereinafter for convenience.

For example carriers having frequencies described herein under (sub-carrier) are used for respective division types.

0: 4.5 MHz
1: 3.76 MHz, 5.25 MHz
2: 3.375 MHz, 4.125 MHz, 4.875 MHz, 5.625 MHz
3: for 1.536 Mbps . . . 3.75 MHz for 768 kbps . . . 4.875 MHz, 5.625 MHz
4: 3.1875 MHz, 3.5625 MHz, 3.9375 MHz, 4.3125 MHz, 4.6875 MHz, 5.0625 MHz, 5.4375 MHz, 5.8125 MHz
5: for 1.536 Mbps . . . 3.75 MHz, for 384 kbps . . . 4.6875 MHz, 5.0625 MHz, 5.4375 MHz, 5.8125 MHz
6: 3.09375 MHz, 3.28125 MHz, 3.46875 MHz, 3.65625 MHz, 3.84375 MHz, 4.03125 MHz, 4.21875 MHz, 4.40625 MHz, 4.59375 MHz, 4.78125 MHz, 4.96875 MHz, 5.15625 MHz, 5.34,375 MHz, 5.53125 MHz, 5.7.1875 MHz, 5.90625 MHz
7:3.075 MHz, 3.225 MHz, 3.375 MHz, 3.525 MHz, 3.675 MHz, 3.825 MHz, 3.975 MHz, 4.125 MHz, 4.275 MHz, 4.425 MHz, 4.575 MHz, 4.725 MHz, 4.875 MHz, 5.025 MHz, 5.175 MHz, 5.325 MHz, 5.475 MHz, 5.625 MHz, 5.775 MHz, 5,925 MHz
8: for 1.536 Mbps . . . 3.75 MHz 4.575 MHz, 4.725 MHz for 144 kbps . . . 4.575 MHz, 4.725 MHz, 4.875 MHz, 5.025 MHz, 5.175 MHz, 5.325 MHz, 5,475 MHz, 5.625 MHz, 5.775 MHz, 5.925 MHz
9: 3.046875 MHz, 3.140625 MHz, 3.234375 MHz, 3.328125 MHz, 3.421875 MHz, 3.515625 MHz, 3.609375 MHz, 3.703125 MHz, 3.796875 MHz, 3.890625 MHz, 3.984375 MHz, 4.078125 MHz, 4.171875 MHz, 4.265625 MHz, 4.359375 MHz, 4.453125 MHz, 4.546875 MHz, 4.640625 MHz, 4.734375 MHz, 4.828125 MHz, 4.921875 MHz, 5.015625 MHz, 5.109375 MHz, 5.203125 MHz, 5.296875 MHz, 5.390625 MHz, 5.484375 MHz, 5.578125 MHz, 5.671875 MHz, 5.765625 MHz, 5.859375 MHz, 5.953125 MHz Assuming the division type is represented by t (t is an integer of 0 or more), the following frequency band division methods are considered to be possible.
0: 3.072 Mbps×1 band
1: 1.536 Mbps×2 bands
2: 768 kbps×4 bands
3: 384 kbps×8 bands
4: 192 kbps×16 bands
. . .
t: 3.072 Mbps/$2^t$×$2^t$ bands
. . .

Carriers of respective frequency bands for respective division types are listed herein under.
0: 4.5 MHz
1: 3.75 MHz, 5.25 MHz
2: 3.375 MHz, 4.125 MHz, 4.875 MHz, 5.625 MHz,
3: 3.1875 MHz, 3.5625 MHz, 3.9375 MHz, 4.3125 MHz, 4.6875 MHz, 5.0625 MHz, 5.4375 MHz, 5.8125 MHz
4: 3.09375 MHz, 3.28125 MHz, 3.46875 MHz, 3.65625 MHz, 3.84375 MHz, 4.03125 MHz, 4.21875 MHz, 4.40625 MHz, 4.59375 MHz, 4.78125 MHz, 4.96875 MHz, 5.15625 MHz, 5.34375 MHz, 5.53125 MHz, 5.71875 MHz, 5.90625 MHz,
. . .
t: $3(1+(2c+1)/2^{t+1})$ MHz (wherein c is a variable for representing respective frequency bands acquired by frequency division, and is 0, 1, 2, . . . , t from the low frequency band).

In such frequency band division, for example, the audio signal in conformity with IEC-958 format such as stereo audio data which is 48 kHz sampled and afterward 32 bit quantized is pertinent to the signal having a data rate of 3.072 Mbps. The stereo audio signal which is 48 kHz sampled and afterward 16 bit quantized is pertinent to the, signal having a data rate of, 1.536 Mbps. A monophonic audio signal which is 48 kHz sampled and afterward 16 bit quantized is pertinent to the signal having a data rate of 768 kbps.

The reason for the data rate of the respective frequency bands being prescribed to, for example, 3.072 Mbps, 1.536 Mbps, or 768 kbps is that the sampling frequency is 48 kHz, and the data rate should be an integer multiple of the sampling frequency. Accordingly, if the sampling frequency is, for example, 44.1 kHz or 32 kHz, then the data rate of respective frequency bands should be a value 44.1 kHz/48 kHz times or 32 kHz/48 kHz times 3.072 Mbps, 1.536 Mbps, or 768 kbps.

If the sampling frequency is, for example, 44.1 kHz, the data rate should be 2.8224 Mbps for 3.073 Mbps, 1.4112 Mbps for 1.536 Mbps, and 705.6 kbps for 768 kbps. Otherwise, if the sampling-frequency is, for example, 32 kHz, the data rate should be 2.048 Mbps for 3.072 Mbps, 1.024 Mbps for 1.536 Mbps, and 512 kbps for 768 kbps.

For example, a stereo audio signal which is 44.1 kHz sampled and thereafter 32 bit quantized is pertinent to the signal having a data rate of 2.8224 Mbps. For example, a stereo audio signal which is 44.1 kHz sampled and thereafter 16 bit quantized is pertinent to the signal having data rate of 1.4112 Mbps. A monophonic audio signal which is 44.1 kHz sampled and thereafter 16 bit quantized is pertinent to the signal having a data rate of 705.6 kbps. For example, a stereo audio signal which is 32 kHz sampled and thereafter 32 bit quantized is pertinent to the signal having a data rate of 2.048 Mbps. For example, a stereo audio signal which is 32 kHz sampled and thereafter 16 bit quantized is pertinent to the signal having a data rate of 1.024 Mbps. For example, a monophonic audio signal which is 32 kHz sampled and thereafter 16 bit quantized is pertinent to the signal having a data rate of 512 kbps.

If the audio data to be transmitted is compressed the data rate is not constant. In such a case, the data rate is an integer multiple of the sampling frequency of the audio data, and a value larger than the maximum data rate of the audio data after compression is prescribed. For example, if the audio data is 48 kHz sampled, the data rate is prescribed to, for example, 384 kbps, 192 kbps, 144 kbps, or 96 kbps. In such a case, the audio data to be provided in the section shown in FIG. 6 is composed of bytes less than 1856, and if, such deficiency of the audio data occurs, for example, a 0 may be provided.

According to the transmission apparatus described in claim 1, the transmission channel clock having a frequency 5/4 times the data clock is generated based on the digital data by the modulation means, and the modulated signal is outputted at the timing of the transmission channel clock. On the other hand, the modulation means generates a data clock based on the received signal, and outputs a digital data at the timing of the data clock. It is possible therefore to efficiently transmit the digital data by way of infrared-rays with suppressed complexity of data processing for modulation and demodulation.

According to a sending apparatus described in claim 25, the transmission channel clock having a frequency 5/4 times the data clock is generated based on the digital data, and the modulated signal is outputted at the timing of the transmission channel clock. It is possible therefore to efficiently transmit the digital data by way of infrared-rays with suppressed complexity of data processing for modulation and demodulation.

According to the receiving apparatus described in claim 26, the data clock having a frequency 4/5 times the clock is generated based on the received signal, and the digital data is outputted at the timing of the data clock.

According to the transmission method described in claim 27, the transmission speed between the modulation means and demodulation means is prescribed to the speed equivalent to the frequency 5/4 times the data clock of the digital data. It is therefore possible to efficiently transmit the digital data by way of infrared-rays with suppressed complexity of data processing for modulation and demodulation.

What is claimed is:

1. A transmission apparatus, comprising:

modulation means for phase shift modulating a subcarrier based on a digital data and outputting a modulated signal;

infrared emitting means for modulating an infrared-ray, being the main carrier wave, based on said modulated signal outputted from said modulation means and outputting the modulated infrared-ray resultant from the modulation;

light receiving means for receiving said modulated infrared-ray from said infrared emitt ing means and outputting a received signal corresponding to said modulated signal; and demodulation means for demodulating said received signal outputted from said light receiving means and regenerating said digital data, wherein said modulation means includes transmission channel clock generating means for generating a transmission channel clock having a frequency 5/4 times the data clock based on said digital data, and outputting said modulated signal at the timing of said transmission channel clock, and further wherein said demodulation means includes data clock regenerating means for generating said data clock based on said received signal, and outputting said digital data at the timing of said data clock.

2. The transmission apparatus of claim 1 wherein said sub-carrier has a frequency of 4.5 MHz.

3. The transmission apparatus of claim 1 wherein said modulation means QPSK (Quadrature Phase Shift Keying)-modulates said sub-carrier.

4. The transmission apparatus of claim 1 wherein said modulation means performs TCM (Trellis Coded Modulation) modulation and 8PSK (Eight Phase Shift Keying) modulation in combination on said sub-carrier.

5. The transmission apparatus of claim 1 wherein said modulation means further includes differential coding means for differentially coding the symbol of said digital data in two bit units.

6. The transmission apparatus of claim 5 wherein said transmission channel clock generating means generates said transmission channel clock having a frequency 5/8 times the symbol clock of said symbol.

7. The transmission apparatus of claim 5 wherein said modulation means further includes random code generating means for generating a random code, and scrambling means for scrambling said symbol using said random code outputted from said random code generating means, and said differential coding means differentially codes said symbol scrambled by said scrambling means.

8. The transmission apparatus of claim 1 wherein said modulation means further includes random code generating means for generating a random code, and scrambling means for scrambling said digital data using said random code outputted from said random code generating means.

9. The transmission apparatus of claim 8 wherein said random code generating means generates said random code based on M (Maximum length linear shift register sequence code)-series or a count value of a counter.

10. The transmission apparatus of claim 9 wherein said M-series has a bit length of 13 bits.

11. The transmission apparatus of claim 1 wherein said modulation means further includes error correcting code generating means for generating an error correcting code for error correcting said digital data and adding it to said digital data.

12. The transmission apparatus of claim 11 wherein said error correcting code is a Reed-Solomon code.

13. The transmission apparatus of claim 12 wherein said Reed-Solomon code is defined on Galois field G ($2^8$) and the code length or minimum distance is respectively 58 or 11.

14. The transmission apparatus of claim 11 wherein said modulation means further includes structuring means for structuring said digital data of 1536×n bytes (n is a positive integer) and said error correcting code of 320×n bytes as one unit.

15. The transmission apparatus of claim 11 wherein said modulation means further includes structuring means for structuring said digital data of 1584×n bytes (n is a positive integer) and said error correcting code of 330×n bytes as one unit.

16. The transmission apparatus of claim 11 wherein said modulation means further includes memory means for storing said digital data added with said error correcting code, and said digital data added with said error correcting code is interleaved by being written in a certain writing order in said memory means and being subsequently read in a different reading order.

17. The transmission apparatus of claim 1 wherein said modulation means further includes synchronizing data adding means for adding a synchronizing data for synchronizing in said demodulation means to said digital data.

18. The transmission apparatus of claim 17 wherein said synchronizing data has a bit length of 4 bytes.

19. The transmission apparatus of claim 1 wherein said modulation means further includes header adding means for adding a prescribed header to said digital data.

20. The transmission apparatus of claim 19 wherein said header has a bit length of 60 bytes.

21. The transmission apparatus of claim 19 wherein said header has a bit length of 2 bytes.

22. The transmission apparatus of claim 1 wherein said digital data is obtained by 48-kHz sampling and subsequently 32-bit quantizing a stereo audio signal.

23. The transmission apparatus of claim 1 wherein said digital data includes a plurality of data blocks, each of said data blocks having 192 data frames, each of said data frames having a plurality of sub-frames, and further, each of said sub-frames including a preamble, 24 bits of audio sample word, a validity flag, a user data, a channel status data and a parity data.

24. A transmission apparatus, comprising;

modulation means for phase shift modulating a sub-carrier based on a digital data and outputting modulated signal; and infrared emitting means for modulating an infrared-ray, being the main carrier wave, based on said modulated signal outputted from said modulation means and for outputting the resultant modulated infrared-ray;

wherein said modulation means includes transmission channel clock generating means for generating a transmission channel clock having a frequency 5/4 times the data clock based on said digital data, and outputting said modulated signal at the timing of said transmission channel clock.

25. The apparatus of claim 24 wherein said sub-carrier has a frequency of 4.5 MHz.

26. The apparatus of claim 24 wherein said modulation means QPSK (Quadrature Phase Shift Keying)-modulates said sub-carrier.

27. The apparatus of claim 24 wherein said modulation means performs TCM (Trellis Coded Modulation) modulation and 8PSK (Eight Phase Shift Keying) modulation in combination on said sub-carrier.

28. The apparatus of claim 24 wherein said modulation means further includes differential coding means for differentially coding the symbol of said digital data in two bit units.

29. The apparatus of claim 28 wherein said transmission channel clock generating means generates said transmission channel clock having a frequency 5/8 times the symbol clock of said symbol.

30. The apparatus of claim 28 wherein said modulation means further includes random code generating means for generating a random code, and scrambling means for scrambling said symbol using said random code outputted from said random code generating means, and said differential coding means differentially codes said symbol scrambled by said scrambling means.

31. The apparatus of claim 24 wherein said modulation means further includes random code generating means for generating a random code, and scrambling means for scrambling said digital data using said random code outputted from said random code generating means.

32. The apparatus of claim 31 wherein said random code generating means generates said random code based on M (Maximum length linear shift register sequence code)-series or a count value of a counter.

33. The apparatus of claim 32 wherein said M-series has a bit length of 13 bits.

34. The apparatus of claim 24 wherein said modulation means further includes error correcting code generating means for generating an error correcting code for error correcting said digital data and adding it to said digital data.

35. The apparatus of claim 34 wherein said error correcting code is a Reed-Solomon code.

36. The apparatus of claim 35 wherein said Reed-Solomon code is defined on Galois field G ($2^8$) and the code length or minimum distance is respectively 58 or 11.

37. The apparatus of claim 34 wherein said modulation means further includes structuring means for structuring said digital data of 1536×n bytes (n is a positive integer) and said error correcting code of 320×n bytes as one unit.

38. The apparatus of claim 34 wherein said modulation means further includes structuring means for structuring said digital data of 1584×n bytes (n is a positive integer) and said error correcting code of 330×n bytes as one unit.

39. The apparatus of claim 34 wherein said modulation means further includes memory means for storing said digital data added with said error correcting code, and said digital data added with said error correcting code is interleaved by being written in a certain writing order in said memory means and being subsequently read in a different reading order.

40. The apparatus of claim 24 wherein said modulation means further includes synchronizing data adding means for adding a synchronizing data for synchronizing in said demodulation means to said digital data.

41. The apparatus of claim 40 wherein said synchronizing data has a bit length of 4 bytes.

42. The apparatus of claim 24 wherein said modulation means further includes header adding means for adding a prescribed header to said digital data.

43. The apparatus of claim 42 wherein said header has a bit length of 60 bytes.

44. The apparatus of claim 42 wherein said header has a bit length of 2 bytes.

45. The apparatus of claim 24 wherein said digital data is obtained by 48-kHz sampling and subsequently 32-bit quantizing a stereo audio signal.

46. The apparatus of claim 24 wherein said digital data includes a plurality of data blocks, each of said data blocks having 192 data frames, each of said data frames having a plurality of sub-frames, and further, each of said sub-frames including a preamble, 24 bits of audio sample word, a validity flag, a user data, a channel status data and a parity data.

47. A receiving apparatus for receiving a digital data comprising:
receiving means for receiving an infrared-ray and outputting a received signal corresponding to the infrared-ray; and
demodulation means for demodulating said received signal outputted from said receiving means and regenerating said digital data;
said demodulation means having data clock regenerating means for generating a data clock having a frequency 4/5 times the clock based on said received signal, and outputting said digital data at the timing of said data clock.

48. A transmission method, comprising the steps of:
phase shift modulating a sub-carrier based on a digital data and outputting a modulated signal;
modulating an infrared-ray, being the main carrier wave, based on said modulated signal and outputting a modulated infrared-ray;
receiving said modulated infrared-ray and outputting a received signal corresponding to said modulated signal; and
demodulating said received signal and regenerating said digital data;
wherein said step of phase shift modulating includes the steps of generating a transmission channel clock having a frequency 5/4 times the data clock based on said digital data and outputting said modulated signal at the timing of said transmission channel clock, and further,
wherein said step of demodulating includes the steps of generating said data clock based on said received signal and outputting said digital data at the timing of said data clock.

49. The method of claim 48 wherein said sub-carrier has a frequency of 4.5 MHz.

50. The method of claim 48 wherein said step of phase shift modulating includes QPSK (Quadrature Phase Shift Keying)-modulating said sub-carrier.

51. The method of claim 48 wherein said step of phase shift modulating includes performing TCM (Trellis Coded Modulation) modulation and 8PSK (Eight Phase Shift Keying) modulation in combination on said sub-carrier.

52. The method of claim 48 wherein said step of phase shift modulating further includes the step of differentially coding the symbol of said digital data in two bit units.

53. The method of claim 52 wherein said step of generating said transmission channel clock includes generating said transmission channel clock having a frequency 5/8 times the symbol clock of said symbol.

54. The method of claim 52 wherein said step of phase shift modulating further includes the steps of generating a random code, and scrambling said symbol using said random code, and differentially coding said scrambled symbol.

55. The method of claim 48 wherein said step of phase shift modulating includes the steps of generating a random code, and scrambling said digital data using said random code.

56. The method of claim 55 wherein said step of generating said random code includes the step of generating said random code based on M (Maximum length linear shift register sequence code)-series or a count value of a counter.

57. The method of claim 56 wherein said M-series has a bit length of 13 bits.

58. The method of claim 48 wherein said step of phase shift modulating further includes the steps of generating an error correcting code for error correcting said digital data and adding it to said digital data.

59. The method of claim 58 wherein said error correcting code is a Reed-Solomon code.

60. The method of claim 59 wherein said Reed-Solomon code is defined on Galois field G ($2^8$) and the code length or minimum distance is respectively 58 or 11.

61. The method of claim 58 wherein said step of phase shift modulating further includes the step of structuring said digital data of 1536×n bytes (n is a positive integer) and said error correcting code of 320×n bytes as one unit.

62. The method of claim 58 wherein said step of phase shift modulating further includes the step of structuring said digital data of 1584×n bytes (n is a positive integer) and said error correcting code of 330×n bytes as one unit.

63. The method of claim 58 wherein said step of phase shift modulating further includes the step of storing said digital data added with said error correcting code, said digital data added with said error correcting code interleaved by being written in a certain writing order and subsequently read in a different reading order.

64. The method of claim 48 wherein said step of phase shift modulating further includes the step of adding a synchronizing data for synchronizing in said demodulation step to said digital data.

65. The method of claim 64 wherein said synchronizing data has a bit length of 4 bytes.

66. The method of claim 48 wherein said step of phase shift modulating further includes the step of adding a prescribed header to said digital data.

67. The method of claim 66 wherein said header has a bit length of 60 bytes.

68. The method of claim 66 wherein said header has a bit length of 2 bytes.

69. The method of claim 48 wherein said digital data is obtained by 48-kHz sampling and subsequently 32-bit quantizing a stereo audio signal.

70. The method of claim 48 wherein said digital data includes a plurality of data blocks, each of said data blocks having 192 data frames, each of said data frames having a plurality of sub-frames, and further, each of said sub-frames including a preamble, 24 bits of audio sample word, a validity flag, a user data, a channel status data and a parity data.

* * * * *